(12) United States Patent
Sohn et al.

(10) Patent No.: US 10,779,362 B2
(45) Date of Patent: Sep. 15, 2020

(54) HEATING ELEMENT, MANUFACTURING METHOD THEREOF, COMPOSITION FOR FORMING HEATING ELEMENT, AND HEATING APPARATUS

(71) Applicant: Samsung Electronics Co., Ltd., Gyeonggi-do (KR)

(72) Inventors: Hiesang Sohn, Seoul (KR); Seyun Kim, Seoul (KR); Haengdeog Koh, Hwaseong-si (KR); Doyoon Kim, Hwaseong-si (KR); Soichiro Mizusaki, Suwon-si (KR); Jinhong Kim, Seoul (KR); Hajin Kim, Hwaseong-si (KR); Minjong Bae, Yongin-si (KR); Changsoo Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 222 days.

(21) Appl. No.: 15/836,002

(22) Filed: Dec. 8, 2017

(65) Prior Publication Data
US 2018/0168000 A1 Jun. 14, 2018

(30) Foreign Application Priority Data

Dec. 8, 2016 (KR) .................. 10-2016-0166967
Nov. 7, 2017 (KR) .................. 10-2017-0147613

(51) Int. Cl.
H05B 1/02 (2006.01)
H05B 3/14 (2006.01)
(Continued)

(52) U.S. Cl.
CPC ......... *H05B 1/0263* (2013.01); *B29C 70/025* (2013.01); *B29C 70/88* (2013.01); *C03C 4/14* (2013.01); *C03C 8/14* (2013.01); *C03C 8/16* (2013.01); *C03C 14/004* (2013.01); *C03C 17/007* (2013.01); *C03C 17/008* (2013.01); *H05B 3/14* (2013.01); *H05B 3/141* (2013.01); *H05B 3/146* (2013.01); *H05B 3/26* (2013.01); *C03C 2217/452* (2013.01); *C03C 2217/48* (2013.01); *H05B 2203/013* (2013.01)

(58) Field of Classification Search
CPC ........ H05B 1/0263; H05B 3/14; H05B 3/141; H05B 3/146; H05B 3/26; B29C 70/025; B29C 70/88; C03C 4/14; C03C 8/14; C03C 8/16; C03C 14/004; C03C 17/007; C03C 17/008
See application file for complete search history.

(56) References Cited

U.S. PATENT DOCUMENTS 5,302,810 A * 4/1994 Gauthier ............... B29C 35/02
219/543
6,350,544 B1 2/2002 Takami et al.
(Continued)

FOREIGN PATENT DOCUMENTS

JP 3897709 B2 1/2007
JP 2012180259 A 9/2012
(Continued)

*Primary Examiner* — Jeremy Carroll
(74) *Attorney, Agent, or Firm* — Cantor Colburn LLP

(57) ABSTRACT

A heating element includes a plurality of matrix particles and a conductive inorganic filler disposed at interfaces between the plurality of matrix particles to provide a conductive network.

19 Claims, 13 Drawing Sheets

(51) Int. Cl.
  *B29C 70/88*  (2006.01)
  *C03C 14/00*  (2006.01)
  *B29C 70/02*  (2006.01)
  *C03C 4/14*   (2006.01)
  *C03C 17/00*  (2006.01)
  *C03C 8/16*   (2006.01)
  *C03C 8/14*   (2006.01)
  *H05B 3/26*   (2006.01)

(56) References Cited

U.S. PATENT DOCUMENTS

| | | | |
|---|---|---|---|
| 2011/0042370 A1* | 2/2011 | Choi | C03C 17/3644 |
| | | | 219/553 |
| 2011/0121240 A1 | 5/2011 | Amine et al. | |
| 2011/0226984 A1 | 9/2011 | Nimi et al. | |
| 2012/0294659 A1 | 11/2012 | Lee et al. | |
| 2013/0167502 A1* | 7/2013 | Wilson | B29C 70/025 |
| | | | 57/210 |
| 2015/0118567 A1 | 4/2015 | Chen | |
| 2016/0254072 A1 | 9/2016 | Park et al. | |
| 2017/0171916 A1 | 6/2017 | Kim et al. | |

FOREIGN PATENT DOCUMENTS

| | | |
|---|---|---|
| KR | 101004912 B1 | 12/2010 |
| KR | 1020120129297 A | 11/2012 |
| KR | 101447478 B1 | 9/2014 |
| KR | 101525974 B1 | 5/2015 |
| KR | 1020150047274 A | 5/2015 |
| KR | 1020150072319 A | 6/2015 |

* cited by examiner

FIG. 1A    FIG. 1B    FIG. 1C
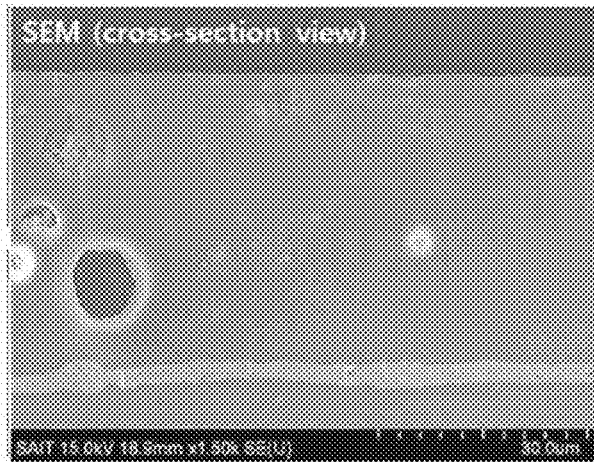 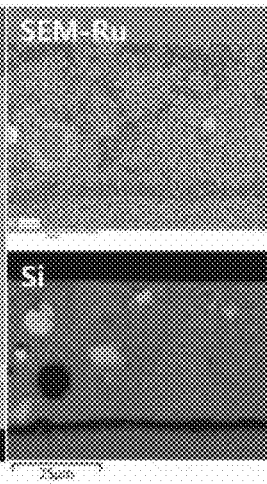 
FIG. 1D    FIG. 1E
FIG. 1F    FIG. 1G
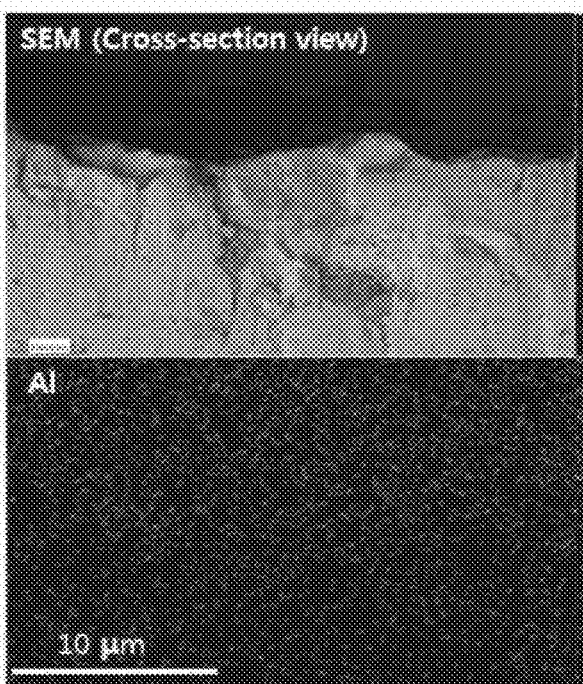 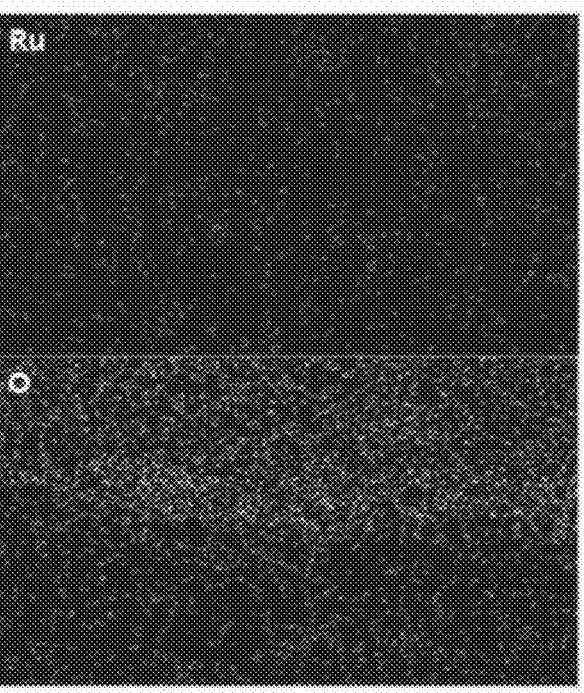
FIG. 1H    FIG. 1I <HEATING ELEMENT FORMING COMPOSITION>

↓ SPRAY COATING

<SPRAY-COATED SUBSTRATE>

↓ SINTERING

<HEATING ELEMENT SUBSTRATE>

ENAMEL/RuO₂ NS
(1 Vol.%) (40 μm)

ENAMEL/RuO₂ NS
(1 Vol.%) (60 μm)

ENAMEL/RuO₂ NS
(1 Vol.%) (20 μm)

F-ENAMEL/RuO₂ NS
(1 Vol.%) (20 μm)

NO TBAOH   w/TBAOH

NO ADDITIVE   TBAOH (0.1%)   TBAOH (0.5%)   TBAOH (1%)   TBAOH (2%)

HEATING ELEMENT, MANUFACTURING METHOD THEREOF, COMPOSITION FOR FORMING HEATING ELEMENT, AND HEATING APPARATUS

CROSS-REFERENCE TO RELATED APPLICATIONS

This application claims priority to and the benefit of Korean Patent Application No. 10-2016-0166967, filed on Dec. 8, 2016, and Korean Patent Application No 10-2017-0147613, filed on Nov. 7, 2017, in the Korean Intellectual Property Office, and all the benefits accruing therefrom under 35 U.S.C. § 119, the contents of which in their entirety are incorporated herein by reference.

BACKGROUND

1. Field

The present disclosure relates to a heating element, a method of manufacturing the same, a composition for forming the heating element, and a heating apparatus including the heating element.

2. Description of the Related Art

Heat generating elements, which may be used in an electric heating apparatus, such as an electric oven, generate heat by Joule heating using a resistive and conductive composite, and thus have excellent thermal properties. However, these heat generating elements cannot uniformly generate heat due to geometric limitations, and thus have low heat generation efficiency. Thus, sheet-type heating elements that heat a two-dimensional plane have drawn a great deal of attention and interest.

It is thus desirable to provide a heat generating element capable of producing uniform heat.

SUMMARY

Provided is a heating element having high electrical conductivity and excellent heat generating characteristics.

Provided is a composition for forming the heating element.

Provided is a method of manufacturing the heating element.

Provided is a heating apparatus including the heating element.

According to an aspect of an embodiment, a heating element includes a plurality of matrix particles; and a conductive inorganic filler disposed at interfaces between the plurality of matrix particles to provide a conductive network.

The heating element may include about 5% to about 99.9% by volume of the matrix particles and about 0.01% to about 95% by volume of the conductive inorganic filler, based on a total volume of the matrix particles and the conductive inorganic filler.

The heating element may include about 95% to about 99.9% by volume of the matrix particles and about 0.1% to about 5% by volume of the conductive inorganic filler, based on a total volume of the matrix particles and the conductive inorganic filler. Since a percolation threshold of the heating element may decrease, high electrical conductivity may be obtained with a small amount of the conductive inorganic filler.

An effective conductivity of the heating element is 30% or greater, wherein effective conductivity is an amount of the conductive inorganic filler contributing actual electrical conductivity compared to the total amount of the conductive inorganic filler.

The conductive inorganic filler may be in a form of nano-sheets, nano-rods, or any combination thereof.

The conductive inorganic filler may be in a form of nano-sheets having a thickness of about 1 nanometer (nm) to about 1,000 nm.

The conductive inorganic filler may include at least one of an oxide, a boride, a carbide, or a chalcogenide.

The oxide may include $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, or any combination thereof, the boride may include $Ta_3B_4$, $Nb_3B_4$, $TaB$, $NbB$, $V_3B_4$, $VB$, or any combination thereof, the carbide may include $Dy_2C$, $Ho_2C$, or any combination thereof, and the chalcogenide may include $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$, or any combination thereof.

The matrix particles may include a glass, an organic polymer, or any combination thereof.

The glass is formed from a glass frit including at least one of a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide.

The glass is formed from a glass frit including at least one of a zinc oxide-silicon oxide, a zinc oxide-boron oxide-silicon oxide, a zinc oxide-boron oxide-silicon oxide-aluminum oxide, a bismuth oxide-silicon oxide-, a bismuth oxide-boron oxide-silicon oxide, a bismuth oxide-boron oxide-silicon oxide-aluminum oxide, a bismuth oxide-zinc oxide-boron oxide-silicon oxide, or a bismuth oxide-zinc oxide-boron oxide-silicon oxide-aluminum oxide compound.

The organic polymer may include at least one of a polyimide (PI), a polyphenylenesulfide (PPS), a polybutylene terephthalate (PBT), a polyamideimide (PAI), a liquid crystalline polymer (LCP), a polyethylene terephthalate (PET), polyphenylene sulfide (PPS), or a polyetheretherketone (PEEK).

According to an aspect of another embodiment, a composition for forming a heating element includes functionalized matrix particles, a conductive inorganic filler, and a solvent.

The matrix particles may include a glass, an organic polymer, or any mixture thereof.

The glass is formed from a glass frit including at least one of a silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, and sodium oxide.

The glass frit is formed from a glass including at least one of a zinc oxide-silicon oxide, a zinc oxide-boron oxide-silicon oxide, a zinc oxide-boron oxide-silicon oxide-aluminum oxide, a bismuth oxide-silicon oxide, a bismuth oxide-boron oxide-silicon oxide, a bismuth oxide-boron oxide-silicon oxide-aluminum oxide, a bismuth oxide-zinc oxide-boron oxide-silicon oxide, or a bismuth oxide-zinc oxide-boron oxide-silicon oxide-aluminum oxide-compound.

The organic polymer may include at least one of a polyimide (PI), a polyphenylenesulfide (PPS), a polybutylene terephthalate (PBT), a polyamideimide (PAI), a liquid crystalline polymer (LCP), a polyethylene terephthalate (PET), a polyphenylene sulfide (PPS), or a polyetheretherketone (PEEK).

The matrix particles may be surface-functionalized with positive charges or negative charges.

The matrix particles may be functionalized with negative charges and may include at least one of a hydroxide ion ($OH^-$), a sulfate ion ($SO_4^{2-}$), a nitrate ion ($NO_3^-$), an acetate ion ($CH_3COO^-$), a permanganate ion ($MnO_4^-$), a carbonate ion ($CO_3^{2-}$), a sulfide ion ($S^{2-}$), a chloride ion ($Cl^-$), a bromide ion ($Br^-$), or an oxide ion ($O^{2-}$).

The conductive inorganic filler may be in a form of nano-sheets, nano-rods, or any combination thereof.

The conductive inorganic filler may be in a form of nano-sheets having a thickness of about 1 nm to about 1,000 nm.

The conductive inorganic filler may have an electrical conductivity of 1,250 Siemens per meter (S/m) or greater.

The conductive inorganic filler may include at least one of an oxide, a boride, a carbide, or a chalcogenide.

The oxide may include $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, or any combination thereof, the boride may include $Ta_3B_4$, $Nb_3B_4$, $TaB$, $NbB$, $V_3B_4$, $VB$, or any combination thereof, the carbide may include $Dy_2C$, $Ho_2C$, or any combination thereof, and the chalcogenide may include $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$, or any combination thereof.

The composition may further include at least one of a dispersion stabilizer, an oxidation stabilizer, a weather stabilizer, an antistatic agent, a dye, a pigment, or a coupling agent.

The dispersion stabilizer may include a low-molecular-weight amine compound, an amine oligomer, an amine polymer, or any combination thereof.

The composition may further include a binder including at least one of a cellulose polymer, an acrylic polymer, a styrene polymer, a polyvinyl resin, a methacrylic ester polymer, a styrene-acrylic acid ester copolymer, a polystyrene, a polyvinyl butyral, a polyvinyl alcohol, a polyethylene oxide, a polypropylene carbonate, a polymethyl methacrylate, a ammonium acrylate, an Arabic gum, a gelatin, an alkyd resin, a butyral resin, a saturated ester resin, a natural rubber, a silicone rubber, a fluorosilicone, a fluoroelastomer, a synthetic rubber, or any copolymer thereof.

The composition may include about 5% to about 99.9% by volume of the matrix particles and about 0.01% to about 95% by volume of the conductive inorganic filler, based on a total volume of the matrix particles and the conductive inorganic filler, and about 5 parts to about 500 parts by volume of the solvent based on 100 parts by volume of the total volume of the functionalized matrix particles and the conductive inorganic filler.

According to an aspect of another embodiment, a heating apparatus includes the heating element.

According to an aspect of another embodiment, a method of manufacturing a heating element includes coating the composition for forming a heating element on a substrate, and heat-treating the coated substrate to provide the heating element.

The coating may be performed by spray coating.

The heat-treating may be performed at a temperature of about 300° C. to about 1200° C.

According to an aspect of another embodiment, a method of manufacturing a composition for forming a heating element includes functionalizing surfaces of matrix particles with positive charges or negative charges, and combining the surface-functionalized matrix particles, a conductive inorganic filler, and a solvent.

The functionalizing may be performed by functionalizing the surfaces of the matrix particles with positively or negatively charged functional groups.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which:

FIGS. 1A to 1E are scanning electron microscope (SEM) images of a heating element manufactured using surface-functionalized matrix particles and $RuO_2$ nano-sheets, according to an embodiment;

FIGS. 1F to 1I are SEM images of a heating element manufactured using matrix particles which are not surface-functionalized and $RuO_2$ nano-sheets according to an embodiment;

DETAILED DESCRIPTION

Figure 2:
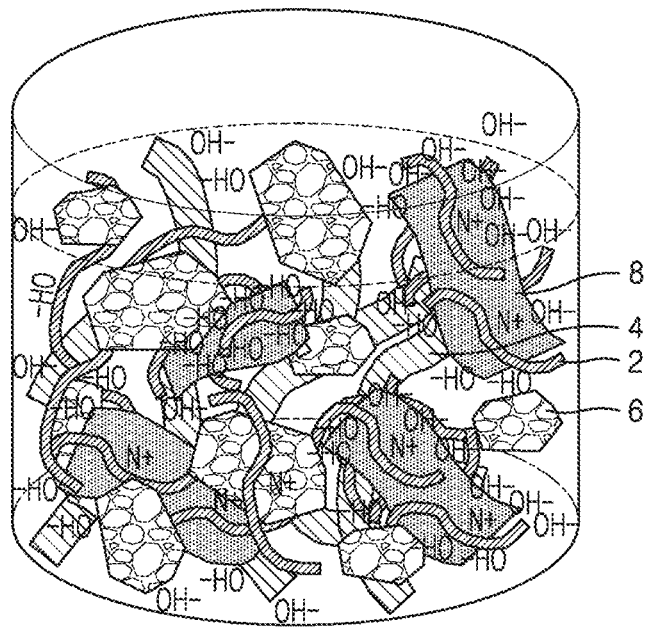
FIG. 2 is a schematic diagram for describing a method of manufacturing a heating element, according to an embodiment.
Figure 2:
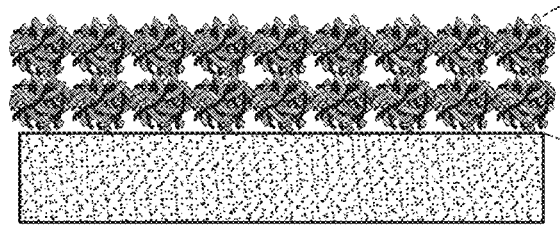
Figure 2:
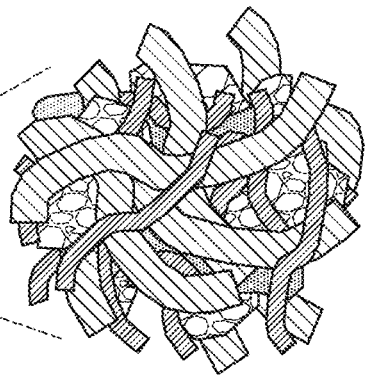
Figure 2:
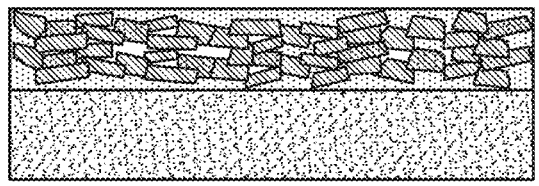

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modifies the entire list of elements and does not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Conductive materials such as $RuO_2$, graphene, and carbon nanotubes have been researched as substances used to form sheet-type heating elements. The sheet-type heating elements may be manufactured using various solution coating methods. The conductive materials and/or matrix materials are uniformly distributed in a heating element coating solution formed of an inorganic material, in order to improve heat generating performance and achieve uniform heat generating characteristics.

As used herein, "composite" refers to a material formed by combining two or more materials having different physical and/or chemical properties, wherein the composite has properties different from each material constituting the composite individually, and wherein particles or wires of each material are at least microscopically separated and distinguishable from each other in a finished structure of the composite.

When a sheet-type heating element, i.e., a heating element in the form of a sheet, is manufactured, a matrix such as a glass frit and a filler that generates heat are mixed together to form a composite. In this case, the individual filler particles are connected to each other and when the filler particles are electrified (i.e., an electrical current is applied thereto), heat may be generated. When a heating element includes a ceramic material as the filler, the filler particles may have a shape in the form of a sphere or a three dimensional polyhedron structure. For example, $RuO_2$ particles having a sphere or polyhedron shape may be used as a filler. When these types of $RuO_2$ particles are used, theoretical percolation between $RuO_2$ particles may be possible when the entire surface of the glass frit particles are covered by the $RuO_2$ particles, and thus stable heat generation may be accomplished.

However, when the $RuO_2$ particles having a sphere or polyhedron shape are used as a filler, a contact area between the $RuO_2$ particles is small, and thus a high temperature may be needed for effective sintering and the amount of $RuO_2$ particles to be percolated in the matrix may need to be increased to achieve the desired heat generation.

The heating element according to an embodiment includes a conductive inorganic filler in the form of nano-sheets, nano-rods, or any combination thereof. The conductive inorganic filler in the form of two-dimensional nano-sheets, one-dimensional nano-rods, or any combination thereof may form a conductive network at interfaces between matrix particles even when using only a small amount. Furthermore, adjacent nano-sheets may be in surface contact with each other, thereby improving sinterability. Thus, by using the heating element according to an embodiment, a percolation network is easily established and a sintering temperature may be reduced as compared to when a filler having a sphere or polyhedron shape is used, and higher electric conductivity may also be obtained even when the same amounts of the filler is used.

Hereinafter, a heating element, a heating apparatus including the same, a composition for forming the heating element, and a method of manufacturing the heating element will be described in detail with reference to the accompanying drawings. In the drawings, thicknesses of layers and regions may be exaggerated for clarity.

A heating element according to an exemplary embodiment includes a plurality of matrix particles and a conductive inorganic filler disposed at interfaces between the plurality of matrix particles to provide a conductive network.

The conductive inorganic filler may exhibit electrical conductivity by forming a conductive network at the interfaces between the matrix particles. When matrix particles whose surfaces are functionalized with positive charges or negative charges are used in the preparation of the heating element, the conductive inorganic filler forms a larger conductive network, so that the heating element may have higher electrical conductivity. Thus, a percolation threshold of the heating element may decrease. That is, excellent heat generating characteristics may be obtained even when a small amount of the conductive inorganic filler providing electrical conductivity is used.

When the amount of a conductive nano filler, which contributes to actual electrical conductivity, compared to the total amount of the conductive inorganic filler included in the heating element is defined as "effective conductivity", the heating element may have a high effective conductivity. For example, the heating element may have an effective conductivity of 30% or greater, i.e., 30% or more of the total amount of conductive filler contributes to the actual electrical conductivity. A heating element having an effective conductivity of 30% or greater may realize high electrical conductivity even when a small amount of the conductive inorganic filler is used between the matrix particles. The effective conductivity of conventional heating elements is less than 30%.

The matrix particles may be a glass formed of a glass frit, or an organic polymer, or any combination thereof.

According to an embodiment, the matrix particles may be formed from the glass frit. The glass frit may include, for example, a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide. Any one or more of the foregoing oxides or their hydrates may be present in the glass of the matrix particles.

For example, the glass frit may include at least one of the following compounds. As is known in the art, the compounds may include other components. The compounds include at least one of a zinc oxide-silicon oxide ($ZnO$—$SiO_2$), a zinc oxide-boron oxide-silicon oxide ($ZnO$—$B_2O_3$—$SiO_2$), a zinc oxide-boron oxide-silicon oxide-aluminum oxide ($ZnO$—$B_2O_3$—$SiO_2$—$Al_2O_3$), a bismuth oxide-silicon oxide ($Bi_2O_3$—$SiO_2$), a bismuth oxide-boron oxide-silicon oxide ($Bi_2O_3$—$B_2O_3$—$SiO_2$), a bismuth oxide-boron oxide-silicon oxide-aluminum oxide ($Bi_2O_3$—$B_2O_3$—$SiO_2$—$Al_2O_3$), a bismuth oxide-zinc oxide-boron oxide-silicon oxide ($Bi_2O_3$—$ZnO$—$B_2O_3$—$SiO_2$), or a bismuth oxide-zinc oxide-boron oxide-silicon oxide-aluminum oxide ($Bi_2O_3$—$ZnO$—$B_2O_3$—$SiO_2$—$Al_2O_3$) compounds. Any one or more of the foregoing compounds, or their hydrates or other oxides may be present in the glass of the matrix particles.

The glass frit may be prepared by adding an additive to silicon oxide, for example. The additive may include at least one of lithium (Li), nickel (Ni), cobalt (Co), boron (B), potassium (K), aluminum (Al), titanium (Ti), manganese (Mn), copper (Cu), zirconium (Zr), phosphorus (P), zinc (Zn), bismuth (Bi), lead (Pb), or sodium (Na). However, the additive is not limited to the elements described above.

According to another exemplary embodiment, the matrix particles may include an organic material having heat resistance, for example, an organic polymer. For example, the organic polymer may have a melting temperature (Tm) of 200° C. or higher. The organic polymer may be at least one of a polyimide (PI), a polyphenylene sulfide (PPS), a polybutylene terephthalate (PBT), a polyamideimide (PAI), a liquid crystalline polymer (LCP), a polyethylene terephthalate (PET), a polyphenylene sulfide (PPS), or a polyetheretherketone (PEEK).

An amount of the matrix particles included in the heating element may be from about 5 to about 99.99% by volume, for example from about 70 to about 99.9% by volume, particularly for example, from about 90 to about 99.9% by volume, or from about 95 to about 99.9% by volume based on a total volume of the matrix particles and the conductive inorganic filler. When the amount of the matrix particles is within these ranges, the matrix particles may sufficiently perform a role as a support for the conductive inorganic filler to form the conductive network.

In the heating element, the conductive inorganic filler forming the conductive network is disposed at the interfaces between the matrix particles.

The conductive inorganic filler may be a particulate filler in the form of a plurality of nano materials. For example, the conductive inorganic filler may be fillers in the form of nano-sheets, nano-rods, or any combination thereof. The nano-sheet type filler and the nano-rod type filler may include nano-sheets or nano-rods of various materials. Although the nano-sheets or the nano-rods may have compositions providing a predetermined electrical conductivity (e.g., 1250 S/m), electrical conductivity of the nano-sheets and the nano-rods may be slightly less or greater than the predetermined electrical conductivity.

The conductive inorganic filler particles may have a thickness of about 1 nm to about 1,000 nm, or about 10 nm to about 900 nm, or about 50 nm to about 750 nm. The conductive inorganic filler particles may have a length of about 0.1 µm to about 500 µm, or about 1 µm to about 400 µm, or about 10 to about 300 µm. When the thickness and the length of the conductive inorganic filler particles are within these ranges above, the conductive network may be formed at the interfaces between matrix particles.

The nano-sheet type filler or the nano-rod type filler may include at least one of an oxide, a boride, a carbide, or a chalcogenide.

An oxide used as the conductive inorganic filler may be, for example, $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, or any combination thereof.

A boride used as the conductive inorganic filler may be, for example, $Ta_3B_4$, $Nb_3B_4$, $TaB$, $NbB$, $V_3B_4$, $VB$, or any combination thereof.

A carbide used as the conductive inorganic filler may be, for example, $Dy_2C$, $Ho_2C$, or any combination thereof.

A chalcogenide used as the conductive inorganic filler may be, for example, $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$, or any combination thereof.

An $RuO_{(2+x)}$ nano-sheet, where $0 \leq x < 0.1$, as an example of the conductive inorganic filler in the form of an oxide may be prepared by the following method. Other oxide-based inorganic fillers may also be prepared using a method which is substantially the same as or similar to the method used to form the $RuO_{(2+x)}$ nano-sheet, where $0 < x < 0.1$.

In order to prepare the $RuO_{(2+x)}$ nano-sheet, $K_2CO_3$ and $RuO_2$ are mixed in a molar ratio of 5:8, and the mixture is formed as pellets. The pellets are placed in an alumina crucible and heat treated for 12 hours in a tube furnace at a temperature of 850° C. The heat treatment may be performed under a nitrogen atmosphere. The weight of the pellet may be in a range from about 1 g to about 20 g. However, the weight of the pellet may vary. The pellet may have a disc shape.

After heat treatment of the pellet, when the temperature of the tube furnace is cooled down to room temperature, the alumina crucible is removed from the tube furnace and the pellet is ground to a powder.

Next, after washing the powder with about 100 milliliters (mL) to about 4 liters (L) of water for 24 hours, the powder is collected by filtering. At this point, the powder has a composition of $K_{0.2}RuO_{2.1} \cdot nH_2O$.

Next, the $K_{0.2}RuO_{2.1} \cdot nH_2O$ powder is immersed in 1 molar (M) HCl and stirred for 3 days at room temperature. Afterwards, the powder is recovered by filtering the mixture. The composition of the powder obtained in this process is $H_{0.2}RuO_{2.1}$.

Next, 1 gram (g) of $H_{0.2}RuO_{2.1}$ powder is immersed in 250 mL of an aqueous solution in which an intercalant, such as tetramethylammonium hydroxide (TMAOH) and tetrabutylammonium hydroxide (TBAOH) are mixed, and the mixture is stirred for more than 10 days at room temperature. In this case, the concentration of TMAOH and TBAOH may be approximately TMA+/H+, TBA+/H+=0.1 to about 50. After the stirring process is completed, the mixture is subjected to a centrifugation process. The centrifugation may be performed for 30 minutes at 2,000 revolutions per minute (rpm). Through the centrifugation process, an aqueous solution including exfoliated $RuO_{(2+x)}$ nano-sheets and a precipitate including un-exfoliated powder are separated from each another.

The concentration of the exfoliated $RuO_2$ nano-sheets in the aqueous solution obtained through the centrifugation process is measured using an ultraviolet-visible spectrophotometer (UVS).

Next, optical absorbency of the $RuO_2$ nano-sheet aqueous solution with respect to a wavelength of 350 nm is measured, and the concentration of the $RuO_2$ nano-sheets in the $RuO_2$ nano-sheet aqueous solution is calculated using an absorbency coefficient (7400 liters per mole centimeter (L/mol·cm)) of the $RuO_2$ nano-sheet.

Next, a volume of the $RuO_2$ nano-sheet aqueous solution is measured which corresponds to a desired weight of $RuO_2$ nano-sheets, and a solvent is removed from the measured $RuO_2$ nano-sheet aqueous solution using a centrifugal separator. In this case, the centrifugal separator may be operated at a speed of 10,000 rpm or greater for 15 minutes or more.

Meanwhile, a chalcogenide nano-sheet may be prepared by the following method.

Raw materials in a solid powder state are prepared. At this point, the raw materials are prepared by weighing appropriate amounts to obtain a desired atomic ratio. Next, the prepared raw materials are uniformly mixed, and afterwards, are made into pellets. After placing the pellets in a quartz tube, the quartz tube is filled with an argon gas and is sealed. The quartz tube in which the pellets are placed is heat treated in a furnace at a temperature in a range from about 500° C. to about 300° C. for about 12 hours to about 72 hours. After the heat treatment, the resultant product is cooled to room temperature, and afterwards, the pellets are removed from the quartz tube and ground into a powder, thereby gaining the pellets in a powder state. Lithium ions are injected between the chalcogenide layers which are in a powder state using a lithium ion source. For example, lithium ions may be injected between the chalcogenide layers in the powder state using a lithium ion source, such as n-butyllithium.

As another example, lithium ions may directly be injected between the chalcogenide layers in the powder state using an electrochemical method instead of using the lithium ion source.

When lithium ions are injected between the chalcogenide layers in the powder state, spaces between the individual chalcogenide layers widen, so that the chalcogenide layers, i.e., chalcogenide nano-sheets, may be easily exfoliated. When the lithium ions are replaced by molecules having a larger size (e.g., water molecules or organic molecules), the spaces between the chalcogenide layers are widened even further. Thus, the chalcogenide nano-sheets may be more easily exfoliated.

As another method of easily exfoliating chalcogenide nano-sheets, after injecting lithium ions between the chalcogenide layers formed in a powder state, the chalcogenide layers may be ultrasonicated.

Boride nano-sheets may be prepared by the following two methods.

A first method is the same method as used to prepare the chalcogenide nano-sheets.

A second method is as follows.

Raw materials in a solid powder state are provided. The raw materials are prepared by weighing appropriate amounts to obtain a desired atomic ratio. Next, the prepared raw materials are uniformly mixed and formed into pellets. After placing the pellets in an arc melting equipment, the pellets are melted at a high temperature using an electric arc. The melting process using an electric arc may be repeated several (e.g., two or more) times until the pellets are uniformly mixed to become a single phase. After the resultant product is cooled down to room temperature, the resultant product is removed from the arc melting equipment and is ground, thereby gaining the pellets in a powder state. Afterwards, lithium ions are injected between individual boride layers which are in a powder state. The lithium ions may be injected between the boride layers formed in a powder state using a lithium ion source, for example, n-butyllithium. Alternatively, lithium ions may directly be injected between the boride layers in the powder state using an electrochemical method instead of using the lithium ion source. When lithium ions are injected between the boride layers which are in a powder state, spaces between the boride layers which are in a powder state may be widened, so that the boride layers, i.e., boride nano-sheets, may be easily exfoliated. When the lithium ions are replaced by molecules having a larger size (e.g., water molecules or organic molecules), the spaces between the boride layers may be widened even further. Thus, the boride nano-sheets may be more easily exfoliated.

The boride nano-sheets may be exfoliated by injecting lithium ions between the boride layers in a powder state and ultrasonicating the boride layers.

Carbide nano-sheets may be prepared using the same method used to prepare the boride nano-sheets described above.

The conductive inorganic filler in the form of nano-rods may be obtained using any method known to those of skill the art.

An amount of the conductive inorganic filler included in the heating element may be from about 0.01 to about 95% by volume, for example from about 0.1 to about 30% by volume, particularly for example from about 0.1 to about 10% by volume, from about 0.1 to about 5% by volume, or from about 1 to about 4% by volume, based on the total volume of the matrix particles and the conductive inorganic filler. When the amount of the conductive inorganic filler is within these ranges, the conductive inorganic filler may establish the conductive network at interfaces between the matrix particles. Since a percolation threshold is decreased in the heating element, high electrical conductivity may be obtained even when a small amount (e.g., 5% by volume or less) of the conductive inorganic filler is used.

The amount of the conductive inorganic filler may vary according to electrical conductivity of the conductive inorganic filler. For example, when the inorganic filler described herein having a high electrical conductivity is used, a heating element having a high electrical conductivity may be obtained even when a small amount of the conductive inorganic filler is used. For example, when a conductive inorganic filler having a high electrical conductivity, such as $RuO_2$, is used, a heating element having excellent electrical conductivity may be prepared with 10% by volume or less of the conductive inorganic filler, based on the total volume of the matrix particles and the conductive inorganic filler.

The conductive inorganic filler may be electrically connected via surface contact and/or line contact in at least one region of the conductive inorganic fillers, at the interfaces between the plurality of matrix particles, thereby forming a conductive network. By using the conductive inorganic filler forming the conductive network, the heating element has electrical conductivity. Without being limited by theory, it is believed that since the conductive inorganic filler does not aggregate, but instead establishes surface contact and/or line contact between adjacent inorganic fillers, electrical conductivity may be increased as compared to prior art particulate fillers. Thus, the heating element including the conductive inorganic filler disposed at interfaces between the plurality of matrix particles according to an embodiment may have higher electrical conductivity than a heating element including a particular filler (e.g., a ceramic filler) having a shape in the form of a sphere or a three dimensional polyhedron structure, even when the same amounts of each filler are used.

Figure 11:
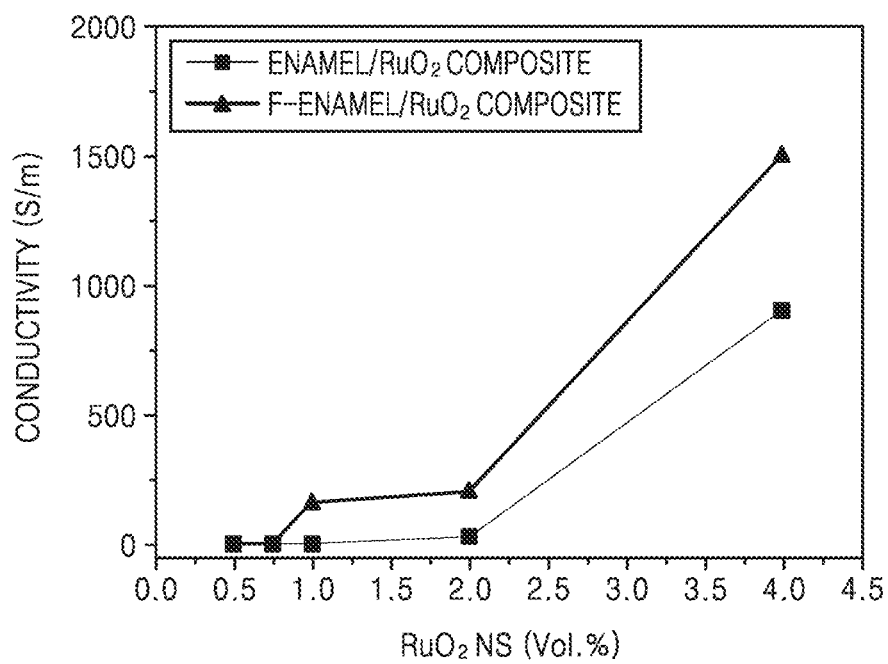
FIG. 11 is a graph illustrating electrical conductivity (Siemens per meter, S/m) versus the amount of $RuO_2$ nano-sheets (volume percent, vol %) in accordance with Experimental Example 2.
Figure 12:
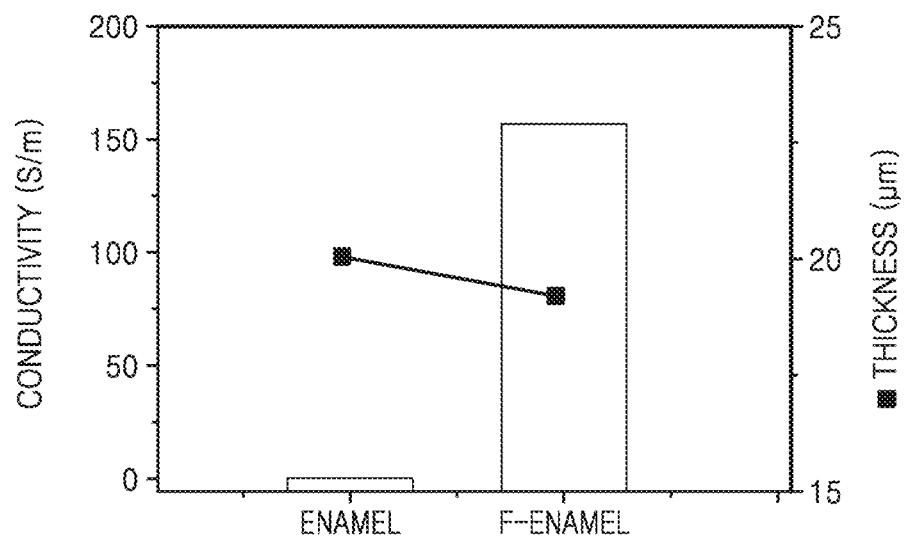
FIG. 12 is a graph of conductivity versus test sample versus thickness (micrometers, μm), illustrating thickness and electrical conductivity of heating elements manufactured by mixing 1 vol % of $RuO_2$ nano-sheets and either the surface-treated enamel frit (F-enamel) or the surface-untreated enamel frit (enamel), according to Experimental Example 2.

The conductive inorganic filler may form a larger conductive network by manufacturing the heating element using matrix particles whose surfaces are functionalized with positive charges or negative charges, as compared with the case where the heating element is prepared by using matrix particles whose surfaces are not functionalized (i.e., surface-unfunctionalized) with positive charges or negative charges. Accordingly, the heating element according to an embodiment may have excellent electrical conductivity due to the larger conductive network even when a small amount of conductive inorganic filler is used. For example, as illustrated in FIGS. 11 and 12, in the case where 1% by volume of the conductive inorganic filler is used based on the total volume of the matrix particles and the conductive inorganic filler, a heating element manufactured using matrix particles surface-functionalized with positive charges or negative charges has an electrical conductivity of about 150 S/m, whereas a heating element manufacturing by using surface-unfunctionalized matrix particles does not have electrical conductivity.

The heating element may further include other components in addition to the matrix particles and the conductive inorganic filler.

Hereinafter, a heating element forming composition for forming a heating element according to an embodiment, will be described.

The heating element forming composition includes a plurality of functionalized matrix particles, a conductive inorganic filler, and a solvent.

The matrix particles may be formed of a glass, an organic polymer, or any mixture thereof.

According to an embodiment, the matrix particles may include glass formed from a frit (e.g., glass frit). The glass frit may include, for example, at least one of a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide.

For example, the glass frit may include at least one of a zinc oxide-silicon oxide ($ZnO$—$SiO_2$), a zinc oxide-boron oxide-silicon oxide ($ZnO$—$B_2O_3$—$SiO_2$), a zinc oxide-boron oxide-silicon oxide-aluminum oxide ($ZnO$—$B_2O_3$—$SiO_2$—$Al_2O_3$), a bismuth oxide-silicon oxide ($Bi_2O_3$—$SiO_2$), a bismuth oxide-boron oxide-silicon oxide ($Bi_2O_3$—$B_2O_3$—$SiO_2$), a bismuth oxide-boron oxide-silicon oxide-aluminum oxide ($Bi_2O_3$—$B_2O_3$—$SiO_2$—$Al_2O_3$), a bismuth oxide-zinc oxide-boron oxide-silicon oxide ($Bi_2O_3$—$ZnO$—$B_2O_3$—$SiO_2$), or a bismuth oxide-zinc oxide-boron oxide-silicon oxide-aluminum oxide ($Bi_2O_3$—$ZnO$—$B_2O_3$—$SiO_2$—$Al_2O_3$) compounds. Any one or more of the foregoing compounds, or their hydrates or other oxides may be present in the glass of the matrix particles.

The glass frit may be prepared by adding an additive to silicon oxide, for example. The additive may include at least one of lithium (Li), nickel (Ni), cobalt (Co), boron (B), potassium (K), aluminum (Al), titanium (Ti), manganese (Mn), copper (Cu), zirconium (Zr), phosphorus (P), zinc (Zn), bismuth (Bi), lead (Pb), and sodium (Na). However, the additive is not limited to the elements described above.

According to an embodiment, the matrix particles may include an organic polymer. The organic polymer may be at least one of a polyimide (PI), a polyphenylene sulfide (PPS), a polybutylene terephthalate (PBT), a polyamideimide (PAI), a liquid crystalline polymer (LCP), a polyethylene terephthalate (PET), a polyphenylene sulfide (PPS), or a polyetheretherketone (PEEK).

The plurality of matrix particles may be surface-functionalized with positive charges or negative charges. The matrix particles surface-functionalized with positive charges or negative charges may have improved dispersibility and stability in the heating element forming composition due to the surface functionalization. In addition, by matching surface charges between the matrix particles and the conductive inorganic filler, dispersion stability of the heating element forming composition may be improved and thus electrical conductivity of a film including the heating element may be increased.

The surfaces of the matrix particles may be functionalized with negative charges. The matrix particles surface-functionalized with negative charges may include, for example, a hydroxide ion ($OH^-$), a sulfate ion ($SO_4^{2-}$), a sulfite ion ($SO_2^{2-}$), a nitrate ion ($NO_3^-$), an acetate ion ($CH_3COO^-$), a permanganate ion ($MnO_4^-$), a carbonate ion ($CO_3^{2-}$), a sulfide ion ($S^{2-}$), a chloride ion ($Cl^-$), a bromide ion ($Br^-$), a fluoride ion ($F^-$), an oxide ion ($O^{2-}$), a carboxylate ion ($COO^-$), a cyanate ion ($OCN^-$), or a tosylate ion (p-toluene sulfonic acid ($CH_3C_6H_4SO_3^-$)) on the surfaces thereof, without being limited thereto. In particular, the matrix particles surface-functionalized with negative charges may include, for example, a carboxylate ion (including a higher fatty acid alkali ion, an N-acryl amino acid ion, alkyl ether carboxylic acid ion, or a combination thereof), a sulfonyl ion (including a C1-C20 alkyl sulfonic acid ion, a C1-C20 alkyl benzene, a C1-C20 alkyl amino acid ion, a C1-C20 alkyl naphthalene sulfonic acid ion, or a combination thereof), a sulfuric acid ester ion (including a C1-C20 alkyl sulfate ion, a C1-C20 alkyl ether sulfate ion, a C1-C20 alkyl aryl ether sulfate ion, or a C1-C20 alkyl amide sulfate ion, or a combination thereof), a phosphate ester ion (including a C1-C20 alkyl phosphate ion, alkyl ether phosphate ion, a C1-C20 alkyl aryl ether phosphate ion, or a combination thereof), and the like.

The matrix particles may be surface-functionalized with positive charges. The matrix particles surface-functionalized with positive charges may include cations, for example, an amine ion ($NH^{4+}$) on the surfaces thereof.

In particular, the cations may include simple aliphatic amine ions having primary to tertiary amines, quaternary ammonium ions, and so-called onium ions such as phosphonium ions and sulfonium ions, for example, amine, alkyl, aromatic, and heterocyclic ammonium ions.

The surface functionalization may be achieved by treating the matrix particles with an ion-containing precursor solution capable of surface-functionalizing the matrix particles with positive charges or negative charges. For example, when the matrix particles are treated with a strong acid such as an RCA solution and then dispersed in water, matrix particles having surfaces functionalized with hydroxide ions may be obtained. The RCA solution is a mixed solution of water ($H_2O$)/hydrogen peroxide ($H_2O_2$)/ammonia water ($NH_4OH$). By using an oxidant such as the RCA solution, the surfaces of the matrix particles of the heating element may be functionalized with a hydrophilic functional group ($OH^-$). The matrix particles surface-functionalized with a hydrophilic group such as $OH^-$ may be uniformly dispersed in a coating slurry and do not aggregate with the conductive inorganic filler stabilized by organic ligands, since the organic ligands are easily adsorbed to the surfaces of the matrix particles. Thus, a stable dispersion coating solution may be prepared. When coated with such a stable coating solution, the conductive inorganic filler may be dispersed and distributed along the matrix (e.g., at interfaces between the matrix particles), thereby forming a stable conductive path.

Such surface-functionalization may also be achieved by treating the matrix particles with an ammonium silane monomer and/or oligomer. Thus, matrix particles whose surfaces are functionalized with positive charges may be obtained.

Whether the surfaces of the matrix particles are functionalized with positive charges or negative charges may be determined by the surface charge characteristics of the conductive inorganic filler. For example, when mixed with the conductive inorganic filler having negative charges, for example, $RuO_2$, the matrix particles may have improved dispersion stability in a solvent via surface functionalization with negative charges.

The conductive inorganic filler included in the heating element forming composition to improve electrical conductivity and/or strength of the heating element, may be in the form of nano-sheets, nano-rods, or any combination thereof as described above.

The conductive inorganic filler may have a thickness of about 1 nm to about 1,000 nm, or about 10 nm to about 900 nm, or about 50 nm to about 750 nm. The conductive inorganic filler may have a length of about 0.1 μm to about 500 μm, or about 1 μm to about 400 μm, or about 10 to about 300 μm. When the thickness and the length of the conductive inorganic filler are within the ranges described above, the conductive network may be formed at the interfaces between the matrix particles even when only a small amount of the conductive inorganic filler is present.

The conductive inorganic filler may have an electrical conductivity of 250 S/m or higher, for example, about 1,000 S/m or higher, or about $1 \times 10^4$ S/m or higher, or about $1 \times 10^5$ S/m or higher, or about $1 \times 10^6$ S/m or higher.

The conductive inorganic filler may include at least one of an oxide, a boride, a carbide, or a chalcogenide.

The oxide may include $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, or any combination thereof.

The boride may include $Ta_3B_4$, $Nb_3B_4$, $TaB$, $NbB$, $V_3B_4$, $VB$, or any combination thereof.

The carbide may include $Dy_2C$, $Ho_2C$, or any combination thereof.

The chalcogenide may include $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$, or any combination thereof.

Electrical conductivities of some of the aforementioned conductive inorganic fillers are shown in Tables 1 to 3 below. Table 1 shows oxide filler materials. Table 2 shows boride and carbide filler materials. Table 3 shows chalcogenide filler materials.

TABLE 1

| Composition | S/m |
|---|---|
| $RuO_2$ | $3.55 \times 10^6$ |
| $MnO_2$ | $1.95 \times 10^6$ |
| $ReO_2$ | $1.00 \times 10^7$ |
| $VO_2$ | $3.07 \times 10^6$ |
| $OsO_2$ | $6.70 \times 10^6$ |
| $TaO_2$ | $4.85 \times 10^6$ |
| $IrO_2$ | $3.85 \times 10^6$ |
| $NbO_2$ | $3.82 \times 10^6$ |
| $WO_2$ | $5.32 \times 10^6$ |
| $GaO_2$ | $2.11 \times 10^6$ |
| $MoO_2$ | $4.42 \times 10^6$ |
| $InO_2$ | $2.24 \times 10^6$ |
| $CrO_2$ | $1.51 \times 10^6$ |
| $RhO_2$ | $3.10 \times 10^6$ |

TABLE 2

| | Composition | σ (S/m) |
|---|---|---|
| Boride | $Ta_3B_4$ | 2335000 |
| | $Nb_3B_4$ | 3402000 |
| | TaB | 1528800 |
| | NbB | 5425100 |
| | $V_3B_4$ | 2495900 |
| | VB | 3183200 |
| Carbide | $Dy_2C$ | 180000 |
| | $Ho_2C$ | 72000 |

TABLE 3

| Composition | σ (S/m) |
|---|---|
| $AuTe_2$ | 433000 |
| $PdTe_2$ | 3436700 |
| $PtTe_2$ | 2098000 |
| $YTe_3$ | 985100 |
| $CuTe_2$ | 523300 |
| $NiTe_2$ | 2353500 |
| $IrTe_2$ | 1386200 |
| $PrTe_3$ | 669000 |
| $NdTe_3$ | 680400 |
| $SmTe_3$ | 917900 |
| $GdTe_3$ | 731700 |
| $TbTe_3$ | 350000 |
| $DyTe_3$ | 844700 |
| $HoTe_3$ | 842000 |
| $ErTe_3$ | 980100 |
| $CeTe_3$ | 729800 |
| $TiSe_2$ | 114200 |
| $TiTe_2$ | 1055600 |
| $ZrTe_2$ | 350500 |
| $HfTe_2$ | 268500 |
| $TaSe_2$ | 299900 |
| $TaTe_2$ | 444700 |
| $TiS_2$ | 72300 |
| $NbS_2$ | 159100 |
| $TaS_2$ | 81000 |
| $Hf3Te_2$ | 962400 |
| $VSe_2$ | 364100 |
| $VTe_2$ | 238000 |
| $NbTe_2$ | 600200 |
| $LaTe_2$ | 116000 |
| $LaTe_3$ | 354600 |
| $CeTe_2$ | 55200 |

As an example of the conductive inorganic filler, $RuO_{(2+x)}$ nano-sheets (0≤x<0.1) may be used.

The heating element forming composition may include a solvent to disperse the surface-functionalized matrix particles and the conductive inorganic filler. The solvent may be water or a mixture of water and an organic solvent miscible with water at room temperature (water-miscible organic solvent). For example, at least 90% by weight of the solvent may be water and more particularly at least 95% by weight of the solvent may be water. According to an embodiment, about 100% by weight of the solvent may be water.

Examples of the organic solvent miscible with water at room temperature may include a C2-C6 monoalcohol (e.g.: ethanol and isopropanol); a C2-C20 polyol, particularly, a C2-C10 polyol, and more particularly, a C2-C6 polyol (e.g., glycerol, propylene glycol, butylene glycol, pentylene glycol, hexylene glycol, dipropylene glycol, and diethylene glycol); a glycol ether and particularly a C3-C16 glycol ether (e.g., a C1-C4 alkyl ether of mono-, di-, or tripropylene glycol and a C1-C4 alkyl ether of mono-, di-, or triethylene glycol); or any combination thereof.

The solvent serves to adjust a viscosity of the heating element forming composition so that a resistance heating element may be manufactured by a spraying method. An amount of the solvent is not particularly limited and may be up to several hundred times a weight of the matrix particles. For example, the amount of the solvent may be in a range of about 5 to about 50,000 parts by weight, particularly, about 10 to about 2,000 parts by weight, about 20 to about 1,000 parts by weight, or about 25 to about 900 parts by weight based on 100 parts by weight of the matrix particles. The amount of the solvent may be increased or decreased to adjust the viscosity of the heating element forming composition.

The heating element forming composition may further include an additive, for example, at least one of a dispersion stabilizer, an oxidation stabilizer, a weather stabilizer, an antistatic agent, a dye, a pigment, and a coupling agent. The amount of the additive in the heating element forming composition is within a range which does not deteriorate the heat generating effects of the heating element.

Among these additives, the dispersion stabilizer improves the dispersion stability of the conductive inorganic filler and provides orientation to the filler so as to prevent aggregation of the conductive inorganic filler and improve dispersibility. Thus, percolation characteristics of the conductive inorganic filler may be improved and electrical conductivity and heat generating characteristics of the prepared heating element may be improved. Examples of the dispersion stabilizer may include a low molecular weight amine compound, an amine oligomer, an amine polymer, or any combination thereof.

When the surface of a nano-sheet type conductive inorganic filler is capped by the dispersion stabilizer, aggregation may be prevented and dispersibility may be improved.

The heating element forming composition may further include a binder. The binder may improve coating properties, heat generating characteristics, and properties of a film including the heating element by improving dispersibility of the conductive inorganic filler and the viscosity of the heating element forming composition.

For example, the binder may include at least one of a cellulose polymer, a (meth)acrylic acid polymer, a styrene polymer, a polyvinyl resin, a (meth)acrylic acid (C1-C6 alkyl) ester polymer, a styrene-(meth)acrylic acid (C1-C6 alkyl) ester copolymer, a polyvinyl butyral, a polyvinyl alcohol, a polyethylene oxide, a polypropylene carbonate, a polymethyl (meth)acrylate, an ammonium (meth)acrylate, an Arabic gum, a gelatin, an alkyd resin, a butyral resin, a saturated polyester, a unsaturated polyester resin, a natural rubber, a silicone rubber, a fluorosilicone, a fluoroelastomer, a synthetic rubber, or a copolymer thereof. For example, the cellulose polymer may be used as the binder to improve coating properties and heat generating characteristics of the heating element.

The heating element forming composition solution is prepared by dissolving the surface-functionalized matrix particles and the conductive inorganic filler, and if desired, the additive such as the dispersion stabilizer, in the solvent. Then the binder may be added to the composition solution.

The heating element forming composition may have a viscosity suitable to be sprayed without causing clogging of a nozzle, but the specific viscosity is not particularly limited. For example, a viscosity of about 10 to about 30 seconds in a Ford Cup #4 (e.g., about 20 to about 100 centipoise) is suitable for general spraying. However, when a special spray gun is used, an amount of the solvent may be increased or decreased to suitably adjust the viscosity.

The heating element forming composition may include about 5 to about 99.99% by volume of the surface-functionalized matrix particles and about 0.01 to about 95% by volume of the conductive inorganic filler based on a total volume of the surface-functionalized matrix particles and the conductive inorganic filler. For example, the heating element forming composition may include about 70 to about 99.99% by volume of the surface-functionalized matrix particles and about 0.01 to about 30% by volume of the conductive inorganic filler, or about 80 to about 99.99% by volume of the surface-functionalized matrix particles and about 0.01 to about 20% by volume of the conductive inorganic filler, based on the total volume of the surface-functionalized matrix particles and the conductive inorganic filler. Within these ranges, the conductive inorganic filler forms a conductive network at interfaces between the matrix particles, and thus a heating element may have electrical conductivity.

The heating element forming composition may include about 5 to about 500 parts by volume of the dispersion stabilizer, for example about 10 to about 300 parts by volume, particularly for example about 50 to about 200 parts by volume, based on 100 parts by volume of the total volume of the surface-functionalized matrix particles and the conductive inorganic filler. Within these ranges, the heating element forming composition may have uniform dispersibility and excellent coating properties.

FIGS. 1A to 1E are scanning electron microscope (SEM) images of a heating element manufactured using surface-functionalized matrix particles and $RuO_2$ nano-sheets according to an embodiment. FIG. 1B shows the distribution of the $RuO_2$ nano-sheets, FIG. 1C shows the distribution of Ru atoms, FIG. 1D shows the distribution of Si atoms, and FIG. 1D shows the distribution of O atoms in the heating element. FIGS. 1F to 1I are SEM images of a heating element manufactured using surface-unfunctionalized matrix particles and $RuO_2$ nano-sheets. FIG. 1F is a cross section of the heating elements, FIG. 1G shows the distribution of Ru atoms, FIG. 1H shows distribution of Al atoms, and FIG. 1I shows the distribution of O atoms.

As illustrated in FIGS. 1A to 1E, it is confirmed that $RuO_2$ nano-sheets form a conductive network along interfaces between the matrix particles in the heating element according to an embodiment. On the contrary, $RuO_2$ nano-sheets do not form a conductive network although the $RuO_2$ nano-sheets are uniformly distributed over the entire structure in the heating element shown in FIGS. 1F to 1I.

Hereinafter, a method of manufacturing a heating element will be described.

FIG. 2 is a schematic diagram for describing a method of manufacturing a heating element according to an embodiment.

First, a composition for forming a heating element is prepared.

The method may include functionalizing surfaces of the matrix particles with positive charges or negative charges and combining the surface-functionalized matrix particles 6, the conductive inorganic filler 8, and a solvent. The method may further include adding a dispersion stabilizer 2 to stabilize the conductive inorganic filler 8 to prevent aggregation thereof and/or selectively adding a binder 4 to the solution obtained thereby. The aforementioned steps may be considered preprocessing procedures for preparing the heating element forming composition.

The preprocessing procedures may be performed to uniformly disperse each of the raw materials in the solvent. The raw materials used to prepare the heating element forming composition are as described above.

The prepared heating element forming composition is coated on a substrate.

The method of coating the heating element forming composition may include screen printing, ink jet printing, dip coating, spin coating, or spray coating.

For example, the heating element forming composition may be coated on the substrate by spray coating. In this case, the heating element forming composition may be spray-coated at a rate of about 10 to about 500 milliliters per minute (mL/min). In addition, a distance between the heating element forming composition and the substrate may be in a range of about 0.1 meter (m) to about 1 m, particularly, about 0.2 m to about 0.9 m, and more particularly, about 0.3 m to about 0.8 m.

When coating the heating element forming composition, an amount of the heating element forming composition which is sprayed may be adjusted and the coating procedure may be repeated several times such that a finally obtained heating element, after evaporation of the solvent by heat treatment, has a predetermined thickness.

Next, the substrate coated with the heating element forming composition is heat-treated to evaporate the solvent included in the heating element forming composition, and the coating is cured to obtain the heating element. The heat treatment may be performed at a temperature in a range of about 300° C. to about 1,200° C., or about 500 to about 1,100° C., or about 750° C. to about 1,000° C.

For example, the coated substrate is dried at a temperature of about 100° C. to about 200° C. to evaporate the solvent. The coated substrate from which the solvent is removed is heat-treated at a temperature of about 500° C. to about 900° C. for about 1 to about 20 minutes. The temperature for heat treatment of the substrate may vary depending upon a material used to form the substrate, a type of the matrix particles, a thickness of the coated composition, and the like.

The heat treatment may be performed by using, for example, a hot plate, without being limited thereto.

It may be confirmed that the heating element prepared as described above has a conductive network of the conductive inorganic filler formed at interfaces between the matrix particles, as shown in FIG. 1.

The heating element may be formed in a single layer.

The heating element may be a sheet type heating element formed on the substrate.

Figure 3:
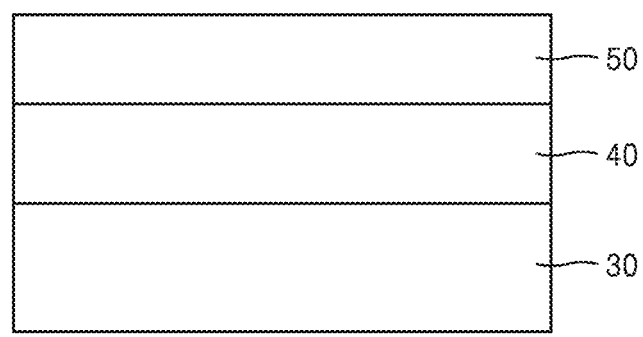
FIG. 3 is a cross-sectional view of a sheet-type heating element including a heating element, according to an embodiment.

FIG. 3 is a schematic cross-sectional view of a sheet type heating element using a heating element according to an embodiment.

Referring to FIG. 3, a heating element 40 is formed on a substrate 30. The substrate 30 may be a single layer or include multiple layers. The heating element 40 may be formed on the substrate 30 through a series of processes, for example, a coating process and a drying process. The heating element 40 may generate heat by energy supplied by an external source. The energy may be electrical energy, but any energy that may be applied to the heating element 40 to facilitate heat generation may also be used, without limitation. The entire structure of the substrate 30 and the heating element 40 may be referred to as a heating element structure.

An upper layer 50 may further be disposed on the heating element 40. The upper layer 50 may be a single layer or include multiple layers. The entire structure of the substrate 30, the heating element 40, and the upper layer 50 may also be referred to as a heating element structure.

A composition of the substrate 30 may be the same as or different from the composition of the matrix particles. For example, the substrate 30 may include at least one of a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide. An amount of the oxide used to form the substrate 30 may be the same as or different from the amount of oxide used to form the matrix particles.

As another example, the substrate 30 may be formed of a material different from the material used to form the matrix particles. For example, the substrate 30 may be a silicon wafer, a metal substrate, or another conductive substrate.

Figure 4:
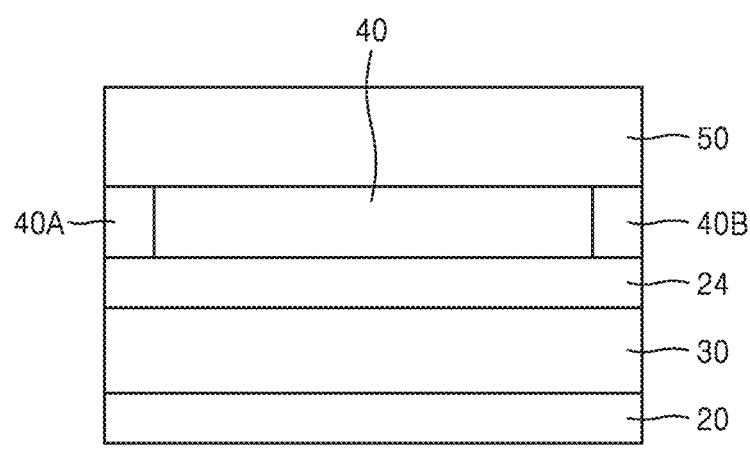
FIG. 4 is a cross-sectional view of the sheet-type heating element of FIG. 3 in which an insulating layer is disposed between the substrate and the heating element.

When the substrate 30 is a conductive substrate, a first insulating layer 24 may further be disposed between the substrate 30 and the heating element 40 as shown in FIG. 4.

Also, a second insulating layer 20 may further be disposed on a lower surface of the substrate 30. The first and second insulating layers 20 and 24 may be the same or different, and may be an oxide glass layer. The oxide glass layer may include at least one of a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide. The oxide glass layer may further include an enamel layer.

In FIG. 4, first and second electrodes 40A and 40B, respectively, are attached to opposite ends of the heating element 40. Electricity may be supplied to the heating element 40 from an external power source through the first and second electrodes 40A and 40B. The entire structure shown in FIG. 4 may also be referred to as a heating element structure.

Hereinafter, an apparatus including the heating element described above will be described with reference to the drawings.

Since the heating element described above may be used as a heat source emitting heat, the heating element may be used in an apparatus which utilizes a heat source, and may be used as a heat generating component or an electronic component. For example, the heating element described above may be applied to a printer, for example, a fuse of the printer. In addition, the heating element described above may also be applied to a thin film resistor or a thick film resistor.

Figure 5:
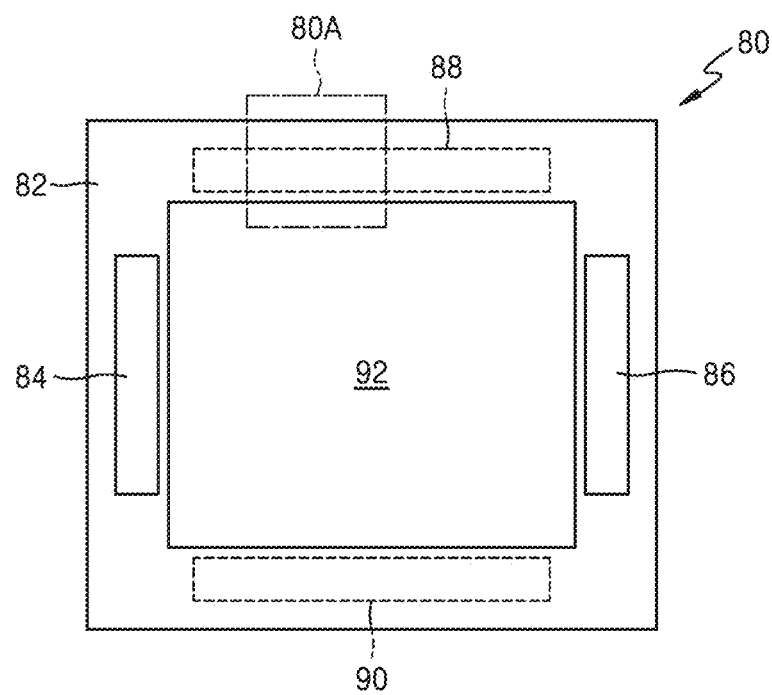
FIG. 5 is a cross-sectional view of an apparatus including a heating element, according to an embodiment.

FIG. 5 is a view of an apparatus including a heating element according to an embodiment as a heat source.

Referring to FIG. 5, an apparatus 80 includes a main body 82 and a first heating element 84 included in the main body 82. The apparatus 80 may be an electrical apparatus or an electronic apparatus. For example, the apparatus 80 may be an oven. The main body 82 of the apparatus 80 may have an inner space 92 for accommodating an object. When the apparatus 80 operates, energy (e.g., heat) may be supplied to the inner space 92 to heat the object placed in the inner space 92 or to increase a temperature of the inner space 92. The first heating element 84 included in the main body 82 of the apparatus 80 may be a heat source to supply the energy to the inner space 92. The first heating element 84 may be arranged such that heat generated by the first heating element 84 is distributed toward the inner space 92.

A second heating element 86 may further be provided in the main body 82. The second heating element 86 may be disposed to face the first heating element 84. The second heating element 86 may be arranged such that heat generated by the second heating element 86 is distributed toward the inner space 92. The first and second heating elements 84 and 86 may be heating elements formed of the same material or different materials. In addition, as marked as dashed lines, a third heating element 88 and a fourth heating element 90 may further be provided in the main body 82. Alternatively, only one of the third heating element 88 and the fourth heating element 90 may be provided therein.

According to another embodiment, the main body 82 may include only the third and fourth heating elements 88 and 90. An adiabatic member or a thermal reflection member may be disposed between external boundary surfaces of the main body 82 and each of the first through fourth heating elements 84, 86, 88, and 90.

Figure 6:
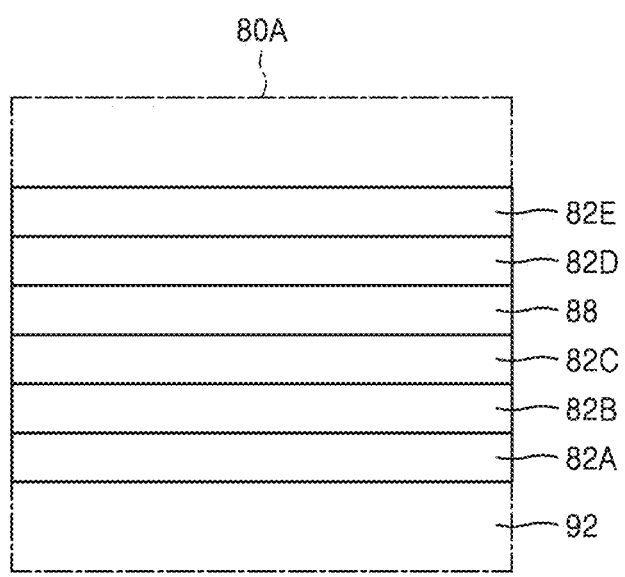
FIG. 6 is a magnified cross-sectional view of a region 80A of the apparatus in FIG. 5.

FIG. 6 is a magnified cross-sectional view of a first region 80A of FIG. 5.

Referring to FIG. 6, in the main body 82, an adiabatic material 82D and a case 82E are sequentially disposed in an upward direction from the third heating element 88, and are between the third heating element 88 and an external region. The case 82E may be an external case. The adiabatic material 82D disposed between the case 82E and the third heating element 88 may extend to regions of the first, second, and fourth heating elements 84, 86, and 90 disposed in the main body 82. The adiabatic material 82D is provided to prevent heat generated by the third heating element 88 from being discharged to an outside of the apparatus 80.

A second insulating layer 82C, a substrate 82B, and a first insulating layer 82A are sequentially disposed in a downward direction from the third heating element 88 between the third heating element 88 and the inner space 92. The first insulating layer 82A, the substrate 82B, the second insulating layer 82C, and the third heating element 88 are sequentially stacked from the inner space 92 towards the outside of the apparatus 80. The layered configuration may also be applied to the regions where the first, second, and fourth heating element 84, 86, and 90 are arranged.

The first and second insulating layers 82A and 82C may be formed of the same insulating material or different insulating materials. At least one of the first and second insulating layers 82A and 82C may be an enamel layer, without being limited thereto, and thicknesses of the first and second insulating layers 82A and 82C may be the same or different. The substrate 82B may be a support member that maintains a structure of the main body 82 of the apparatus 80 while supporting the first through fourth heating elements 84, 86, 88, and 90. The substrate 82B may be, for example, a metal plate, but the present embodiment is not limited thereto.

The stack structure including the heating element 88 as illustrated in FIG. 6 may also be applied to any other apparatuses (e.g., an electric hot pot) to heat an object (e.g., water) as well as the apparatus illustrated in FIG. 5. When the heating element 88 is disposed at the bottom of the apparatus and the object is disposed on the heating element 88, the adiabatic material 82D may be disposed under the heating element 88.

Figure 7A:
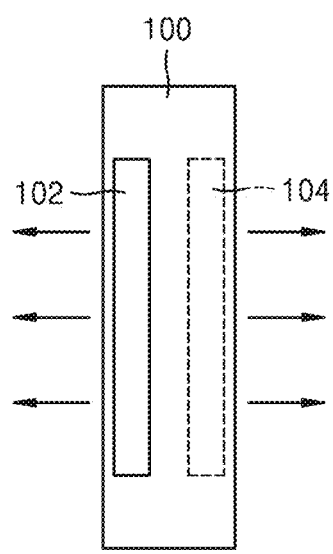
FIGS. 7A and 7B are cross-sectional views of an apparatus including a heating element, according to another embodiment.
Figure 7B:
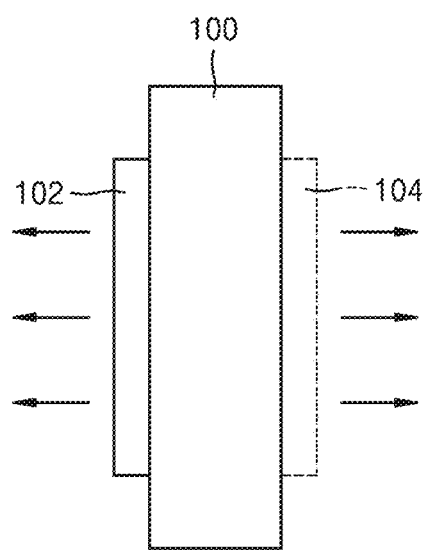

FIGS. 7A and 7B are cross-sectional views of another apparatus including the heating element described above. The apparatus of FIG. 7 may be a heating apparatus.

Referring to FIG. 7A, a first apparatus 102 is disposed inside a wall 100. The first apparatus 102 may be a heating generation apparatus configured to emit heat toward the outside of a first surface of the wall 100. If the wall 100 is at least one of the walls that define a room, the first apparatus 102 may be a heat generation apparatus that emits heat to increase a temperature of the room or to warm up. As illustrated in FIG. 7B, the first apparatus 102 may also be disposed on a surface of the wall 100.

Although not shown, the first apparatus 102 may also be installed apart from the wall 100. When the first apparatus 102 is arranged apart from the wall 100, the first apparatus 102 may be freely moved. Thus, a used may move the first apparatus 102 to an area desired by the user.

The first apparatus 102 may include a heating element (not shown) for generating heat therein. The first apparatus 102 may be buried in the wall 100. However, a panel for operating the first apparatus 102 may be disposed on a surface of the wall 100. A second apparatus 104 may further be disposed inside the wall 100. The second apparatus 104 may be a heat generation apparatus configured to emit heat toward the outside of a second surface of the wall 100. If the wall 100 is at least one of the walls that define the room, the second apparatus 104 may be an apparatus that emits heat to warm up an adjacent room or another region neighboring the room with the wall 100 therebetween. As illustrated in FIG. 7B, the second apparatus 104 may also be installed on a surface of the wall 100. Although not shown, the second apparatus 104 may also be freely moved apart from the wall 100 like the first apparatus 102. The second surface may be a surface opposite to the first surface or facing the first surface. The second apparatus 104 may include a heating element (not shown) that generates heat. The heating element may be a heat source for increasing a temperature of the outside of the second surface of the wall 100. Although most parts of the second apparatus 104 may be buried inside the wall 100, a panel for operating the second apparatus 104 may be disposed on a surface of the wall 100. In FIG. 7, arrows indicate heats emitted from the first and second apparatuses 102 and 104.

Meanwhile, the first and second apparatuses 102 and 104 may have attachable/detachable structures respectively. In this case, the first apparatus 102 or the second apparatus 104 may be mounted on an inner side of a window. For example, assuming that reference numeral 100 of FIG. 7B indicates not a wall but a window, the first apparatus 102 may be a heating apparatus mounted on an inner side of the window 100. In this case, the second apparatus 104 may not be needed. When the first apparatus 102 is mounted on the window, the first apparatus 102 may be mounted on a whole inner surface of the window or may be mounted on only a part of the inner surface of the window.

According to another embodiment, the heating element described above may be applied to a device or an apparatus that provides heat to a user. For example, the heating element described above may be applied to a hot pack or clothes (e.g., a jacket or a vest, gloves, or shoes) that may be worn by the user. In this case, the heating element may be provided on an inner side or inside a cloth.

According to another embodiment, the heating element described above may be applied to a wearable device. The heating element described above may also be applied to outdoor equipment, for example, an apparatus that emits heat in a cold atmosphere.

Hereinafter, one or more embodiments will be described in detail with reference to the following examples. However, these examples are not intended to limit the purpose and scope of the one or more embodiments.

EXAMPLES

Experimental Example 1: Manufacture of Surface-Functionalized Matrix Particles and Evaluation of Dispersion Stability In order to prepare a matrix surface-functionalized with negative charges, 300 g of an enamel frit ($D_{50}$<100 μm, Hae Kwang Enamel Industrial Co., Ltd.) was immersed in 1.2 L of a mixed solution of ammonia, water, and hydrogen peroxide (RCA solution) and surface-treated. Thus, an enamel frit surface-treated with $OH^-$ anions was prepared.

Meanwhile, in order to prepare a matrix surface-functionalized with positive charges, 100 g of an enamel frit ($D_{50}$<100 μm, Hae Kwang Enamel Industrial Co., Ltd.) was surface-treated with a solution of (3-aminopropyl) triethoxysilane (APTES). Thus, an enamel frit surface-treated with $NH^{3+}$ cations was prepared.

Figure 8A:
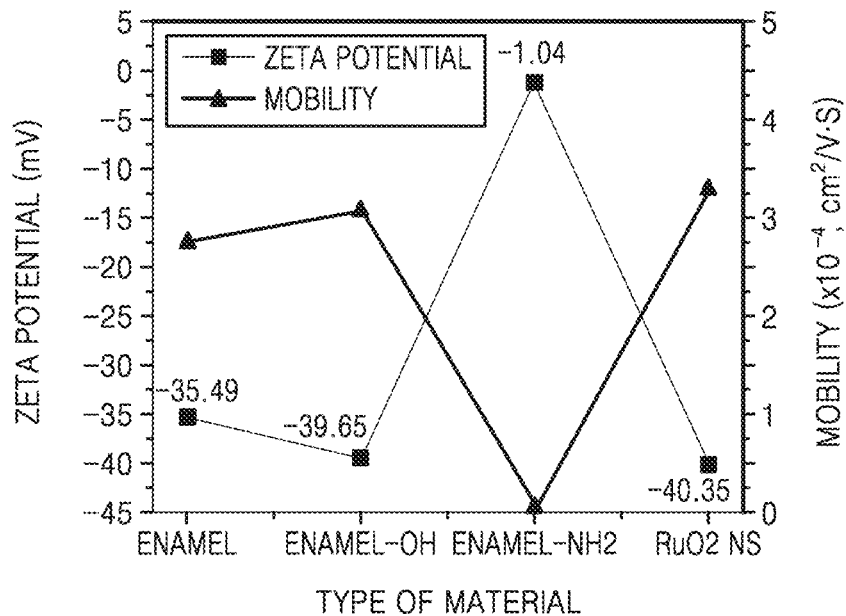
FIG. 8A is a graph of zeta potential (millivolts, mV) versus type of material versus mobility (square centimeters per volt second, $cm^2/Vs$), illustrating the zeta potential and electric mobility of untreated enamel frit, the enamel frits surface-treated with positive charges, the enamel frit surfaces treated with negative charges, the untreated enamel frits, and $RuO_2$ nano-sheets, in accordance with Experimental Example 1.
Figure 8B:
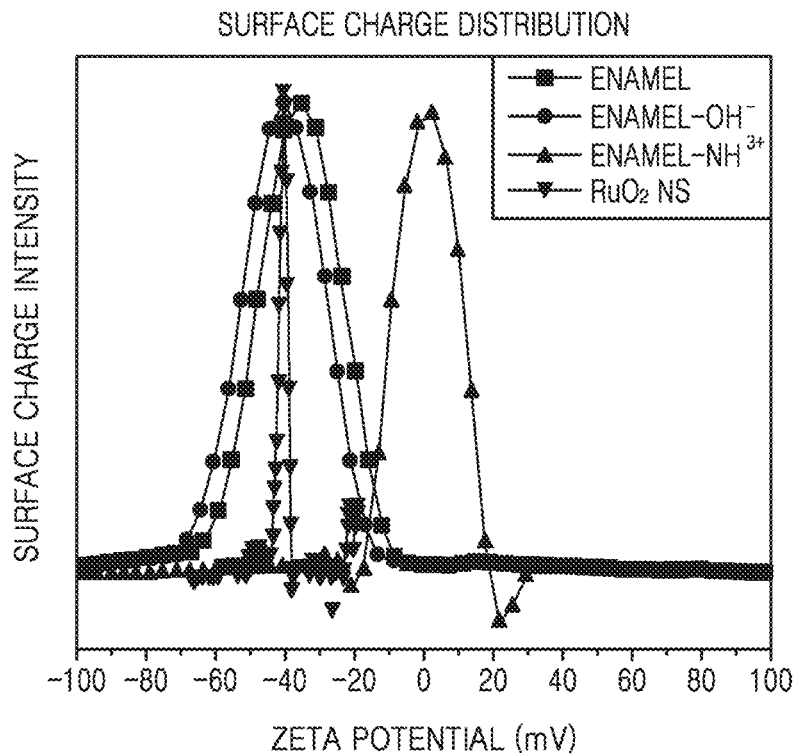
FIG. 8B is a graph of surface charge intensity versus zeta potential (mV) illustrating the surface charge distribution of the enamel frits surface-treated with positive charges, the enamel frits surface-treated with negative charges, the untreated enamel frits, and the $RuO_2$ nano-sheets, prepared in accordance with Experimental Example 1.

Zeta potential, electric mobility, and surface charge distribution of an untreated enamel frit, an enamel frits surface-treated with negative charges, an enamel frit surface-treated with positive charges, and RuO₂ nano-sheets (to be mixed therewith later) were measured and shown in FIGS. 8A and 8B.

In addition, in order to evaluate dispersion stability of the enamel frits before and after surface treatment, 0.1 g of each of the neutral enamel frit which is surface-untreated, the enamel frits which are surface-treated with positive charges, and the enamel frits which are surface-treated with negative charges, was dispersed in water and subjected to a sedimentation test. Test results thereof after 1 day (about 24 hours) are shown in FIG. 9.

To evaluate dispersion stability of mixed slurries of the enamel frits and the RuO₂ nano-sheets before and after surface treatment, 0.2 g of RuO₂ nano-sheets and 1.8 g of each of the neutral surface-untreated enamel frit, the enamel frits surface-treated with positive charges, and the enamel frits which are surface-treated with negative charges were dispersed in water to prepare slurries and the slurries were subjected to a sedimentation test. Test results thereof after 1 day are shown in FIG. 10.

Figure 9:
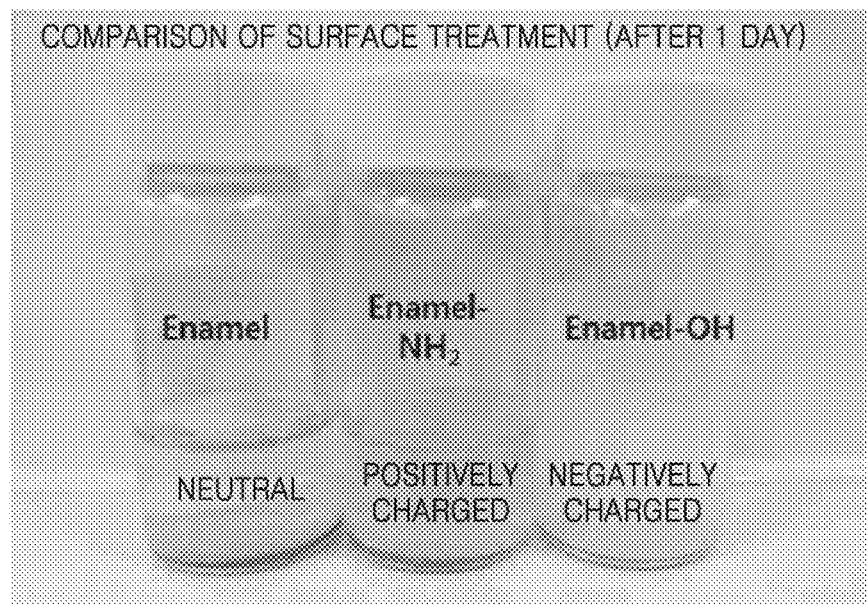
FIG. 9 is a photograph of the sedimentation test results of a neutral untreated enamel frit (before surface treatment), the enamel frits surface-treated with positive charges and negative charges, as prepared in accordance with to Experimental Example 1.
Figure 10:
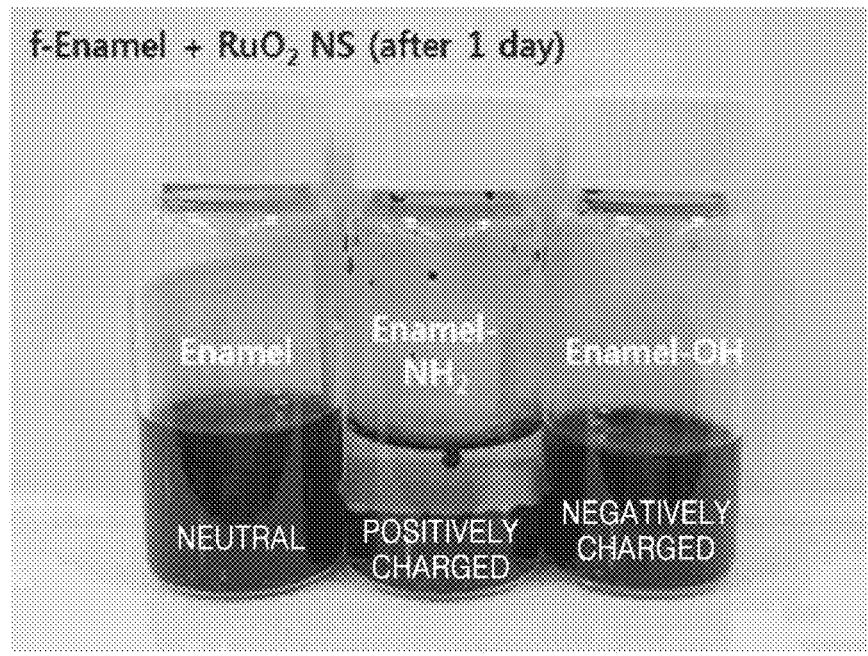
FIG. 10 is a photograph of the sedimentation test results of slurries each including $RuO_2$ nano-sheets and the neutral untreated enamel frit (before surface treatment), the enamel frit surface-treated with positive charges, or the enamel frit surface-treated with and negative charges, the enamel frits surface-treated with Experimental Example 1.

Referring to FIGS. 9 and 10, it was confirmed that the mixed slurry of the enamel frit surface-treated with negative charges and the RuO₂ nano-sheets (having negative surface charges) had excellent dispersion stability. On the contrary, when the enamel frit surface-treated with positive charges is mixed with the RuO₂ nano-sheets (having opposite surface charges thereto), aggregation occurs and thus dispersion stability may deteriorate. In the case of using the neutral enamel frit whose surface was not treated, the degree of aggregation is lower than in the case of the positively charged enamel frit, but greater than in the case of the negative charged enamel frit.

Surface potential, charge mobility, and dispersibility of each of the materials and mixed solutions thereof was measured in the case where hydroxypropyl methylcellulose (HPMC) was added to the composition as a cellulose-based binder, and the results are shown in Table 4 below.

Here, f-enamel is an enamel frit surface-functionalized with anions (i.e., having negative charges) and amounts of the materials included in the mixed solutions are shown in Table 5 below. In addition, dispersibility is a value obtained by measuring transmittance of light with respect to a height of a sample over time using light scattering with a Turbiscan equipment.

TABLE 4

| | Material | Surface potential (mV) | Charge mobility (cm²/V) | Dispersibility (%) |
|---|---|---|---|---|
| Component | HPMC | 0 | 1.26E−03 | 100 |
| | RuO₂ NS | −57.4 | 1.62E−04 | 100 |
| | Enamel | −35.5 | 2.9E−04 | 30 |
| | f-enamel | −39.6 | 3.1E−04 | 50 |
| Mixed solution | RuO₂ NS-HPMC | −57.4 | 1.62E−04 | 100 |
| | f-enamel-HPMC | −113.6 | 3.20E−04 | 80 |
| | RuO₂ NS/Enamel | N/A | N/A | 40 |
| | RuO₂ NS/f-Enamel | N/A | N/A | 70 |
| | RuO₂/f-enamel-HPMC | N/A | N/A | 99 |

TABLE 5

| Mixed solution | RuO₂ | Enamel | HPMC |
|---|---|---|---|
| RuO₂ NS-HPMC | 0.2 g (50 mL) | 0 g | 0.5 g |
| f-enamel-HPMC | 0.2 g (50 mL) | 1.8 g | 0.5 g |
| RuO₂ NS/Enamel | 0.2 g (50 mL) | 1.8 g | 0 g |
| RuO₂ NS/f-Enamel | 0.2 g (50 mL) | 1.8 g | 0 g |
| RuO₂/f-enamel-HPMC | 0.2 g (50 mL) | 1.8 g | 0.5 g |

As shown in Table 4, while the surface-untreated enamel frit alone had a dispersibility of only 30%, the dispersibility was increased to 50% after surface-functionalization with anions. After surface treatment, it was confirmed that the dispersibility of the enamel frit was improved even after being mixed with the RuO₂ nano-sheets. In addition, the dispersibility was increased to 99% when the enamel frit surface-treated with anions was mixed with the RuO₂ nano-sheets and the cellulose-based binder.

Experimental Example 2: Evaluation of Performance of Heating Element Using Surface-Functionalized Matrix Particles 1.8 g of the enamel frit surface-treated with negative charges and prepared according to Experimental Example 1 and 0.2 g of the RuO₂ nano-sheets capped with the TBAOH described above were dispersed in 50 mL of water to prepare a coating solution. The coating solution was spray-coated on an enamel substrate at room temperature and dried at a temperature of about 110 to about 120° C. for 10 minutes. Then, the coated resultant was heat-treated at 750° C. for 16 minutes to manufacture a heating element.

Electrical conductivity with respect to mixing ratios of RuO₂ nano-sheets was measured and the results are shown in FIG. 11. Electrical conductivity was measured as follows. A silver (Ag) paste was applied to opposite ends of the manufactured heating element and dried to form electrodes. Electrical conductivity of the heating element was measured by measuring resistance between the electrodes and measuring a width, a length, and a thickness of the heating element.

As illustrated in FIG. 11, it may be confirmed that the heating element prepared using the surface-treated enamel frit has better electrical conductivity than the heating element prepared using the surface-untreated enamel frit.

In addition, FIG. 12 illustrates thickness and electrical conductivity of heating elements in which 1 volume percent (vol %) of the RuO₂ nano-sheets is combined with either the surface-functionalized enamel frit (f-enamel) or the surface-unfunctionalized enamel frit (enamel). As illustrated in FIG. 12, even when the enamel frits were mixed with the same amount of the RuO₂ nano-sheets, the heating element manufactured using the surface-treated enamel frit had a far greater electrical conductivity despite having a smaller thickness.

Figure 13:
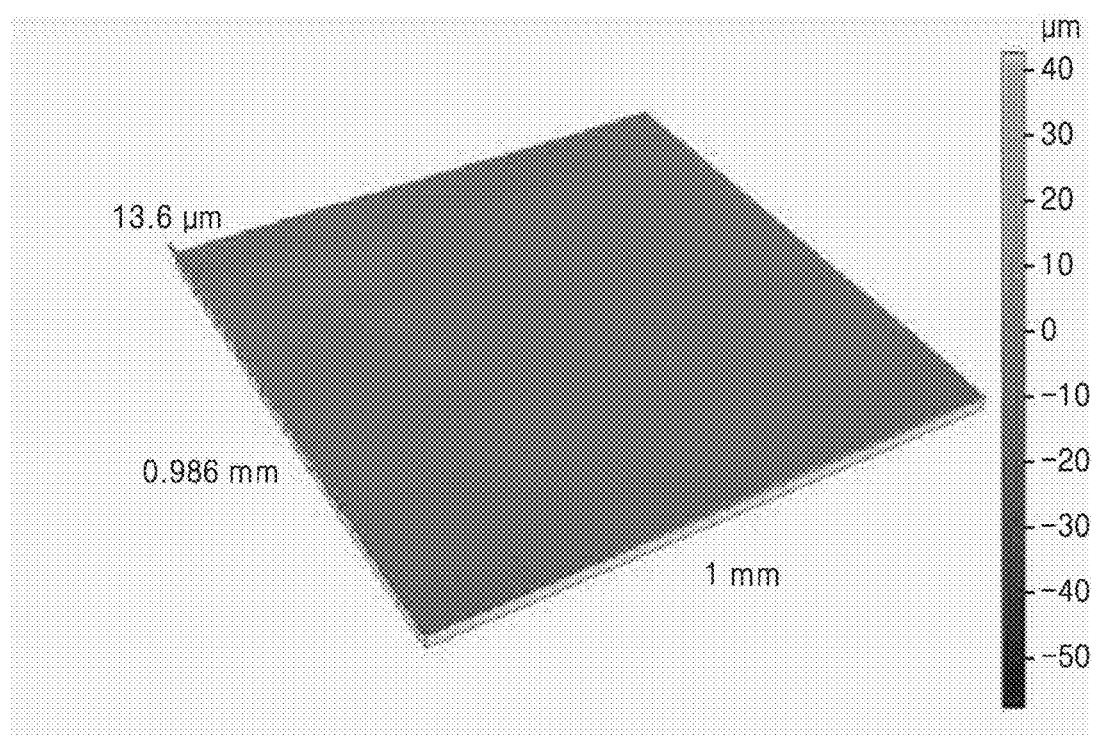
FIG. 13 illustrates properties of a film formed using a heating element manufactured using a surface-treated enamel frit and 1% by volume of $RuO_2$ nano-sheets according to Experimental Example 2.
Figure 14A:
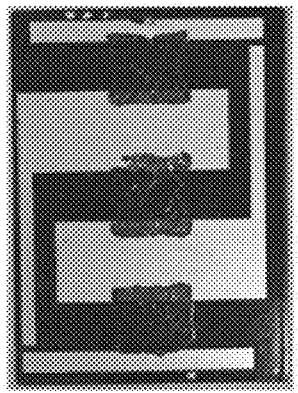
FIGS. 14A to 14D illustrates film morphology of heating elements having various thicknesses, and which are formed of surface-treated enamel frits and surface-untreated enamel frits and 1% by volume of $RuO_2$ nano-sheets, according to Experimental Example 2.
Figure 14B:
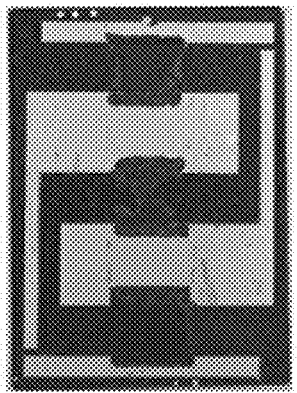
Figure 14C:
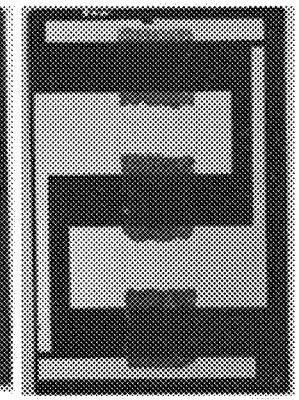
Figure 14D:
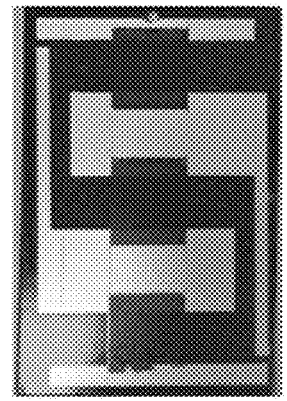

Meanwhile, the quality of a film formed of the heating element manufactured using the surface-treated enamel frit and 1% by volume of the RuO₂ nano-sheets was measured and is shown in FIG. 13. A surface roughness of the heating element was 2.14 μm at a film thickness of 22 μm indicating uniform surface characteristics.

FIGS. 14A to 14D illustrate the film morphology of the heating elements having various thicknesses, in the case where the surface-untreated or surface-treated enamel frits and the RuO₂ nano-sheets (1 vol) were used. As shown in FIGS. 14A to 14D, it may be confirmed that the heating element manufactured using the surface-treated enamel frit (FIG. 14D) forms a clean and clear film at a small thickness of 20 μm indicating a stable coating force even after sintering.

Experimental Example 3: Evaluation of Capping Effect of RuO$_2$ Nano-Sheets Using Dispersion Stabilizer In order to confirm the capping effect of the RuO$_2$ nano-sheets in the case where the enamel frit is surface-treated with negative charges and prepared according to Experimental Example 1 above and a dispersion stabilizer is used, the following procedure was performed.

The surfaces of the RuO$_2$ nano-sheets were stabilized using tetrabutylammonium hydroxide (TBAOH) as the dispersion stabilizer, the stabilization occurring via intermolecular forces such as van der Waals forces or hydrogen bonds. 1.8 g of the enamel frit surface-treated with negative charges and prepared according to Experimental Example 1 described above and 0.2 g of the RuO$_2$ nano-sheets capped with TBAOH were dispersed in 50 mL of water to prepare a coating solution. The coating solution was spray-coated on an enamel substrate at room temperature and the coated resultant was dried at a temperature of about 110° C. to about 120° C. for 10 minutes and heat-treated at 750° C. for 16 minutes, thereby completing the manufacture of a heating element.

Figures 15A, 15B:
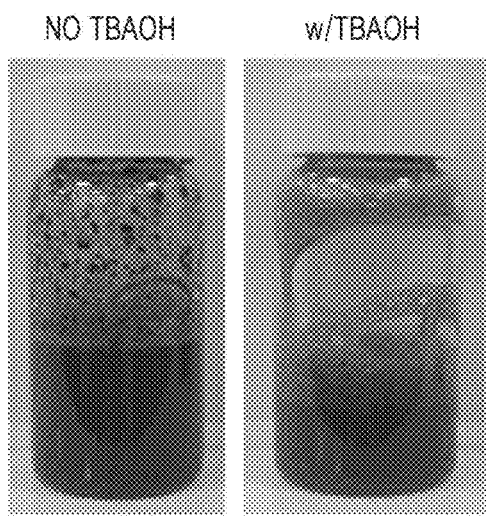
FIGS. 15A and 15B are photographs showing the coating solutions in the presence (FIG. 15B) and absence (FIG. 15A) of a dispersion stabilizer, according to Experimental Example 3.
Figures 16A, 16B, 16C, 16D, 16E:
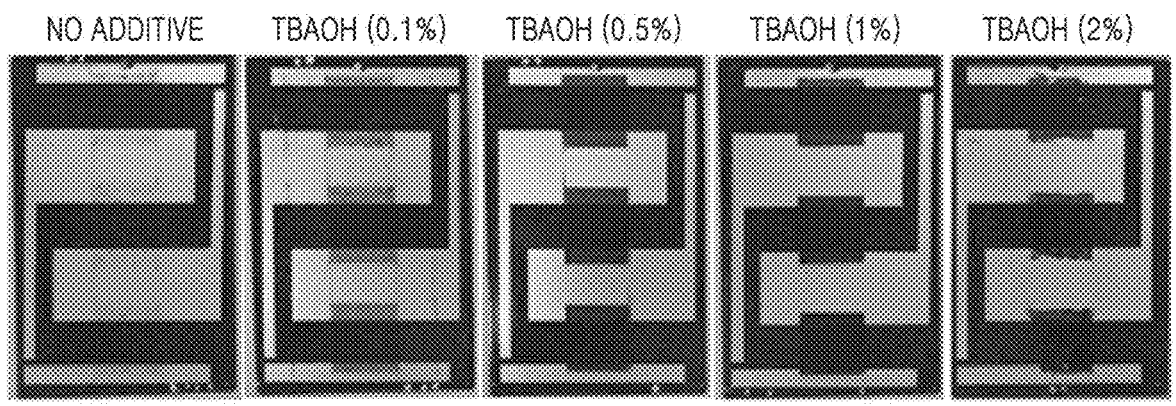
FIGS. 16A to 16E are photographs of films formed of heating elements including 0%, 0.1%, 0.5%, 1%, or 2% of a dispersion stabilizer, respectively, prepared according to Experimental Example 3.

The performance of coating solutions and heating elements including the enamel frit surface-treated with negative charges and prepared according to Experimental Example 1 and RuO$_2$ nano-sheets before and after being capped with TBAOH, are shown in FIGS. 15A and 15B, and in Table 6 below.

FIGS. 15A and 15B are photographs showing the dispersion stability of coating solutions in the presence (FIG. 15B) and absence (FIG. 15A) of TBAOH.

Table 6 below shows the viscosity and dispersibility of the coating solutions and the thickness variation and electrical conductivity of films including the heating elements in the presence and absence of TBAOH.

TABLE 6

|  | No TBAOH | With TBAOH |
| --- | --- | --- |
| Viscosity (cps) | 354 | 303 |
| Dispersibility (%) | 40 | 99 |
| Thickness variation (%) | 35 | 9.6 |
| Electrical conductivity (S/m) | 0.01 | 165 |

As shown in FIG. 15 and Table 6, it may be confirmed that when the RuO$_2$ nano-sheets capped with the dispersion stabilizer are used, dispersibility of the coating solution is further improved and electrical conductivity of the heating element is further increased.

Figure 17:
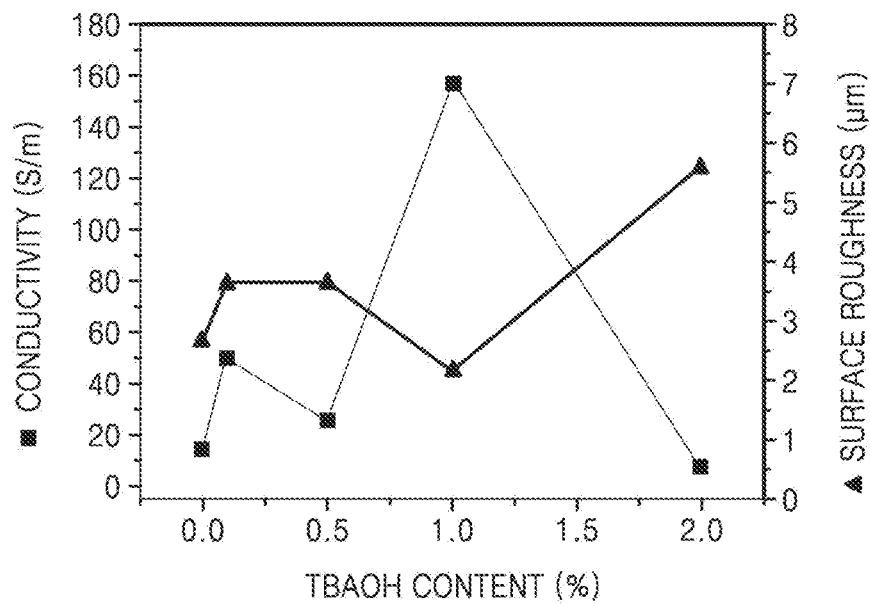
FIG. 17 is a graph of conductivity (S/m) versus amount of tetrabutylammonium hydroxide (TBAOH, %), illustrating electrical conductivity and surface roughness of heating elements with respect to the amount of the dispersion stabilizer, according to Experimental Example 3.

In addition, in order to compare film quality and electrical conductivity of a heating element according to the amount of TBAOH, heating elements were manufactured using RuO$_2$ nano-sheets capped with 0.1% by weight, 0.5% by weight, 1% by weight, and 2% by weight of TBAOH. FIGS. 16A to 16E are photographs showing the film quality of the heating elements. FIG. 17 is a graph illustrating electrical conductivity and surface roughness of the heating elements with varying TBAOH content.

As shown in FIGS. 16 and 17, it may be confirmed that both the film quality and electrical conductivity of the heating element were improved in the case where the RuO$_2$ nano-sheets were stabilized by using 2% by weight or less of the dispersion stabilizer, as compared to the case of not using the dispersion stabilizer. In particular, when about 1% by weight of the dispersion stabilizer was used, the heating element exhibited the best film quality and the highest electrical conductivity. However, when the amount of the dispersion stabilizer is greater than about 2% by weight, the film quality and electrical conductivity of the heating element deteriorated. Without being limited by theory, it is believed that this occurred because excessive capping of the conductive inorganic filler may deteriorate formation of the conductive network.

Experimental Example 4: Evaluation of Effect of Binder

In order to identify the effects of using the enamel frit surface-treated with negative charges and prepared according to Experimental Example 1 and a binder, experiments were performed as follows.

0.5 g of hydroxypropyl methylcellulose (HPMC) was added to a coating solution prepared by dispersing 1.8 g of the enamel frit surface-treated with negative charges and prepared according to Experimental Example 1 and 0.2 g of RuO$_2$ nano-sheets in 50 mL of water. The coating solution was spray-coated onto an enamel substrate at room temperature and the coated substrate was dried at a temperature of about 110° C. to about 120° C. for 10 minutes and heat-treated at 750° C. for 16 minutes to manufacture a heating element.

Table 7 below shows viscosity, dispersibility of coating solutions and thickness variations and electrical conductivity of the heating elements manufactured using the same in the presence and absence of HPMC.

TABLE 7

|  | No HPMC | with HPMC |
| --- | --- | --- |
| Viscosity (cps) | 4 | 354 |
| Dispersibility (%) | 40 | 80 |
| Thickness variation (%) | 35 | 15 |
| Electrical conductivity (S/m) | 0.47 | 19.35 |

As shown in Table 7, the viscosity of the coating solution varies according to the type of polymer binder. Since the organic stabilizer is an oligomer, it may be seen that viscosity is not considerably influenced thereby.

Figure 18A:
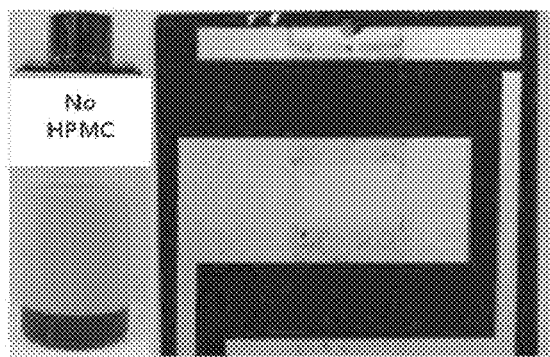
FIGS. 18A and 18B are photographs of coating solutions and properties of films formed of heating elements in the presence (FIG. 18B) and absence (FIG. 18A) of a binder, according to Experimental Example 4.
Figure 18B:
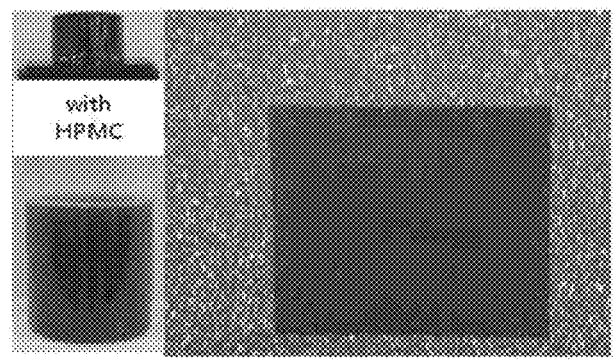

FIGS. 18A and 18B are photographs showing dispersion stability of the coating solutions and the quality of films including the heating elements in the presence (FIG. 18B) and absence of HPMC (FIG. 18A). As shown in FIGS. 18A and 18B, it may be seen that as the amount of the binder increases, the dispersion stability of the coating solution and the quality of the film of the heating element are further improved.

Experimental Example 5: Comparison and Evaluation of Thermal Properties of Sheet Type Heating Element (1) Preparation of Coating Solution In order to compare and evaluate thermal properties of sheet type heating elements according to the composition of the coating solution, coating solutions are prepared as shown in Table 8 below.

TABLE 8

| Composition | Matrix | Filler | Stabilizer | Binder |
|---|---|---|---|---|
| (1) No treatment | Enamel (1.8 g) | $RuO_2$ NS (0.2 g/50 mL) | TBAOH (0 g) | HPMC (0 g) |
| (2) w/HPMC | Enamel (1.8g) | $RuO_2$ NS (0.2 g/50 mL) | TBAOH (0 g) | HPMC (0.5 g) |
| (3) w/HPMC-TBAOH | Enamel (1.8 g) | $RuO_2$ NS (0.2 g/50 mL) | TBAOH (0.5 g) | HPMC (0.5 g) |
| (4) f-enamel w/ HPMC-TBAOH | F-enamel (1.8 g) | $RuO_2$ NS (0.2 g/50 mL) | TBAOH (0.5 g) | HPMC (0.5 g) |

(2) Method of Preparing Coating Solution

An amine-based stabilizer (TBAOH) is mixed with a colloidal solution of $RuO_2$ NS used as a conductive filler and a binder (HPMC) is added thereto. The mixture is stirred for about 1 day (about 24 hours). In case of further adding polyethyleneimine (PE) thereto as the amine-based stabilizer, a mixture of TBAOH and PEI is stirred for about 1 day (about 24 hours) and then the binder (HPMC) is further added thereto and stirred. After stirring, the solution in which the $RuO_2$ NS, the stabilizer, and the binder are uniformly mixed and a surface-functionalized enamel frit are mixed to prepare a slurry coating solution.

(3) Method for Evaluating Heat Generating Characteristics

Temperatures of heating elements coated on a fabricated plate are monitored in real time while increasing a voltage by supplying a current to the heating elements. The temperatures of the heating elements are indirectly measured by using a thermal imager or a non-contact temperature meter. The heat generating characteristics are obtained by measuring whether or not the temperature continuously increases or is interrupted due to a short circuit as the applied voltage continuously increases. A highest temperature of the heating element without cracks or fails in accordance with application of the voltage is determined as a highest heating temperature.

(4) Evaluation Results

Figure 19:
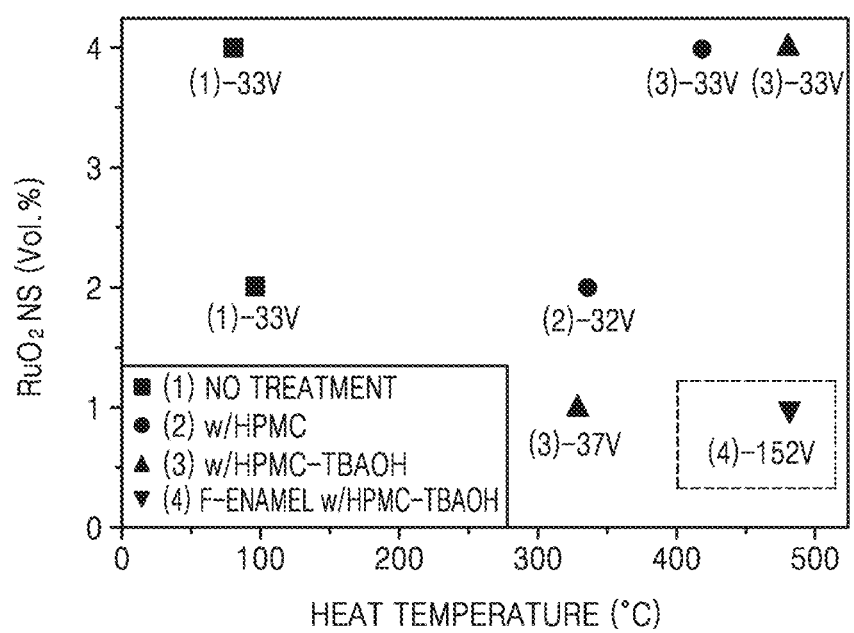
FIG. 19 is a graph of the concentration of $RuO_2NS$ nano-sheets (vol %) versus temperature (° C.) illustrating the thermal properties of heating elements manufactured according to Experimental Example 5.
Figure 20:
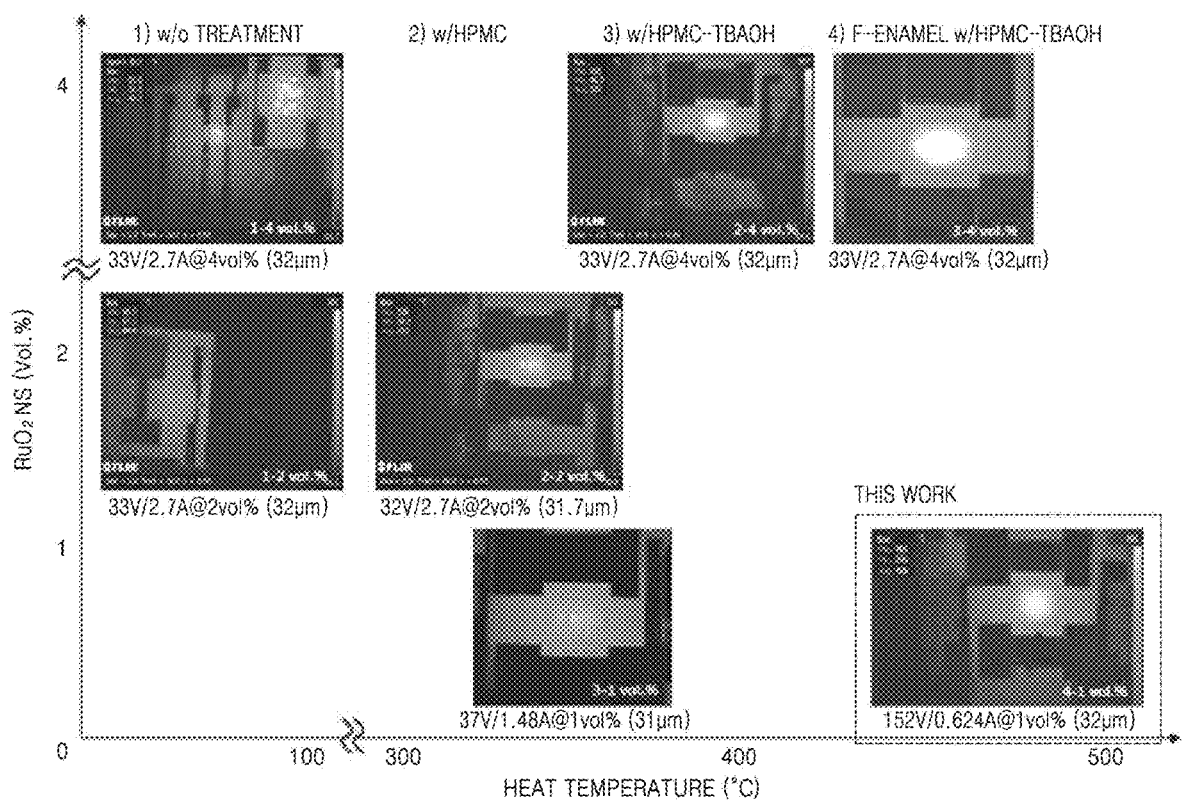
FIG. 20 visually illustrates the thermal properties at each of the points in the heating elements of FIG. 19.

FIG. 19 is a graph illustrating evaluation results of thermal properties of the heating elements. FIG. 20 visually illustrates the thermal properties of the heating elements of FIG. 19 respectively. In FIGS. 19 and 20, 33 V and 152 V indicate withstand voltages at each temperature. As the withstand voltage increases, power increases and voltage breakdown of a heat generating conductor decreases, thereby improving heat generating characteristics.

As shown in FIGS. 19 and 20, in the case of using the surface-functionalized enamel frit, excellent heat generating characteristics may be accomplished with a small amount of $RuO_2$ nano-sheets. Similar heat generating characteristics may be obtained with about a quarter amount of $RuO_2$ nano-sheets in comparison with the case of using the surface-unfunctionalized enamel frit.

The heating element forming composition according to an embodiment may manufacture a heating element having excellent dispersion stability, high quality of the film even with a small amount of the conductive inorganic filler, high electrical conductivity, and excellent heat generating characteristics.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composition for forming a heating element, the composition comprising matrix particles having positively or negatively charged surface, a conductive inorganic filler, and a solvent.

2. The composition of claim 1, wherein the matrix particles comprise a glass, an organic polymer, or any combination thereof.

3. The composition of claim 2, wherein the glass is formed from a glass frit comprising at least one of a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide.

4. The composition of claim 2, wherein the glass is formed from a glass frit comprising at least one of a zinc oxide-silicon oxide, a zinc oxide-boron oxide-silicon oxide, a zinc oxide-boron oxide-silicon oxide-aluminum oxide, bismuth oxide-silicon oxide-, a bismuth oxide-boron oxide-silicon oxide, a bismuth oxide-boron oxide-silicon oxide-aluminum oxide, a bismuth oxide-zinc oxide-boron oxide-silicon oxide, or a bismuth oxide-zinc oxide-boron oxide-silicon oxide-aluminum oxide compound.

5. The composition of claim 2, wherein when the organic polymer is used, the organic polymer comprises at least one of a polyimide, a polyphenylenesulfide, a polybutylene terephthalate, a polyamideimide, a liquid crystalline polymer, a polyethylene terephthalate (PET), a polyphenylene sulfide, or a polyetheretherketone.

6. The composition of claim 1, wherein the matrix particles shave positively or negatively charged functional groups on the surfaces thereof.

7. The composition of claim 1, wherein the matrix particles comprise at least one of hydroxide ion ($OH^-$), a sulfate ion ($SO_4^{2-}$), a nitrate ion ($NO_3^-$), an acetate ion ($CH_3COO^-$), a permanganate ion ($MnO_4^-$), a carbonate ion ($CO_3^{2-}$), a sulfide ion ($S^{2-}$), a chloride ion ($Cl^-$), a bromide ion ($Br^-$), or an oxide ion ($O^{2-}$).

8. The composition of claim 1, wherein the conductive inorganic filler is in a form of nano-sheets, nano-rods, or any combination thereof.

9. The composition of claim 1, wherein the conductive inorganic filler is in a form of nano-sheets having a thickness of about 1 nanometer to about 1,000 nanometers.

10. The composition of claim 1, wherein the conductive inorganic filler has an electrical conductivity of 1,250 Siemens per meter or greater.

11. The composition of claim 1, wherein the conductive inorganic filler comprises at least one of an oxide, a boride, a carbide, and a chalcogenide.

12. The composition of claim 11, wherein
the oxide comprises $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, or any combination thereof,
the boride comprises $Ta_3B_4$, $Nb_3B_4$, TaB, NbB, $V_3B_4$, VB, or any combination thereof,
the carbide comprises $Dy_2C$, $Ho_2C$, or any combination thereof, and
the chalcogenide comprises $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, $CeTe_2$, or any combination thereof.

13. The composition of claim 1, further comprising at least one of a dispersion stabilizer, an oxidation stabilizer, a weather stabilizer, an antistatic agent, a dye, a pigment, or a coupling agent.

14. The composition of claim 13, wherein when the dispersion stabilizer is used, the dispersion stabilizer comprises a low-molecular-weight amine compound, an amine oligomer, an amine polymer, or any combination thereof.

15. The composition of claim 1, further comprising a binder, wherein the binder comprises at least one of a cellulose polymer, a (meth)acrylic acid polymer, a styrene polymer, a polyvinyl resin, a (meth)acrylic (C1-C6 alkyl) ester polymer, a styrene-(meth)acrylic (C1-C6 alkyl) ester copolymer, a polyvinyl butyral, a polyvinyl alcohol, a polyethylene oxide, a polypropylene carbonate, a polymethyl (meth)acrylate, an ammonium (meth)acrylate, an Arabic gum, a gelatin, an alkyd resin, s butyral resin, s saturated ester polymer, a natural rubber, a silicone rubber, a fluorosilicone, a fluoroelastomer, a synthetic rubber, or any copolymer thereof.

16. The composition of claim 1, wherein the composition comprises:
about 5% to about 99.9% by volume of the matrix particles and about 0.01% to about 95% by volume of the conductive inorganic filler, based on a total volume of the matrix particles and the conductive inorganic filler, and
about 5 parts to about 500 parts by volume of the solvent based on 100 parts by volume of the total volume of the functionalized matrix particles and the conductive inorganic filler.

17. A method of manufacturing a heating element, the method comprising:
coating the composition for forming a heating element of claim 1 on a substrate; and
heat-treating the coated substrate to provide the heating element.

18. The method of claim 17, wherein the coating is performed by spray coating.

19. The method of claim 17, wherein the heat-treating is performed at a temperature of about 300° C. to about 1200° C.

* * * * *